United States Patent
Chen et al.

(10) Patent No.: US 10,606,036 B2
(45) Date of Patent: Mar. 31, 2020

(54) OPTICAL IMAGING LENS

(71) Applicant: GENIUS ELECTRONIC OPTICAL (XIAMEN) CO., LTD., Xiamen, Fujian (CN)

(72) Inventors: Yu-Ming Chen, Taichung (TW); Pei-Chi Wang, Taichung (TW)

(73) Assignee: GENIUS ELECTRONIC OPTICAL CO., LTD., Taichung (TW)

( * ) Notice: Subject to any disclaimer, the term of this patent is extended or adjusted under 35 U.S.C. 154(b) by 175 days.

(21) Appl. No.: 15/807,601

(22) Filed: Nov. 9, 2017

(65) Prior Publication Data

US 2019/0113713 A1    Apr. 18, 2019

(30) Foreign Application Priority Data

Oct. 13, 2017   (CN) .......................... 2017 1 0950363

(51) Int. Cl.
*G02B 13/00*    (2006.01)
*G02B 9/62*     (2006.01)

(52) U.S. Cl.
CPC ........... *G02B 13/0045* (2013.01); *G02B 9/62* (2013.01)

(58) Field of Classification Search
CPC ............................. G02B 13/0045; G02B 9/62
USPC ....................................................... 359/713
See application file for complete search history.

(56) References Cited

U.S. PATENT DOCUMENTS

2015/0036230 A1*   2/2015   Bone ........................ G02B 9/64
                                                              359/754

FOREIGN PATENT DOCUMENTS

JP          2015034922          2/2015

OTHER PUBLICATIONS

"Office Action of Taiwan Counterpart Application," dated Dec. 21, 2017, p. 1-p. 10, in which the listed reference was cited.

* cited by examiner

*Primary Examiner* — Nicholas R. Pasko
*Assistant Examiner* — Mitchell T Oestreich
(74) *Attorney, Agent, or Firm* — JCIPRNET

(57) ABSTRACT

An imaging lens includes first, second, third, fourth, fifth and six lens elements arranged in order from an object side to an image side along an optical axis. Each lens element has an object-side surface and an image-side surface. The image-side surface of the second lens element has a concave portion in a vicinity of the optical axis. The third lens element has negative refractive power. The object-side surface of the third lens element has a concave portion in a vicinity of the optical axis. The object-side surface of the fifth lens element has a convex portion in a vicinity of a periphery. All lens elements of the imaging lens having the refractive power are only the first, second, third, fourth, fifth and six lens elements.

19 Claims, 21 Drawing Sheets

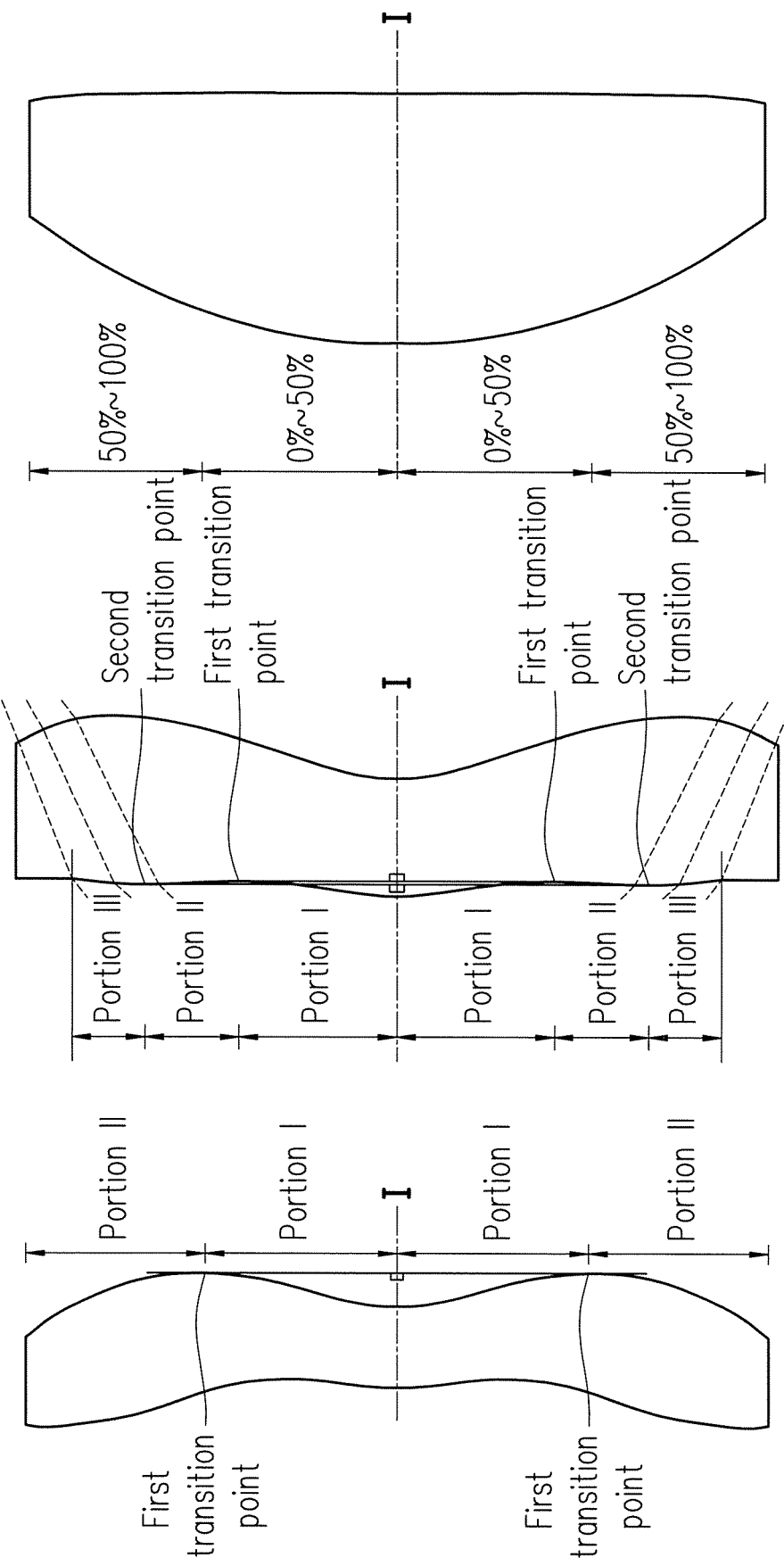

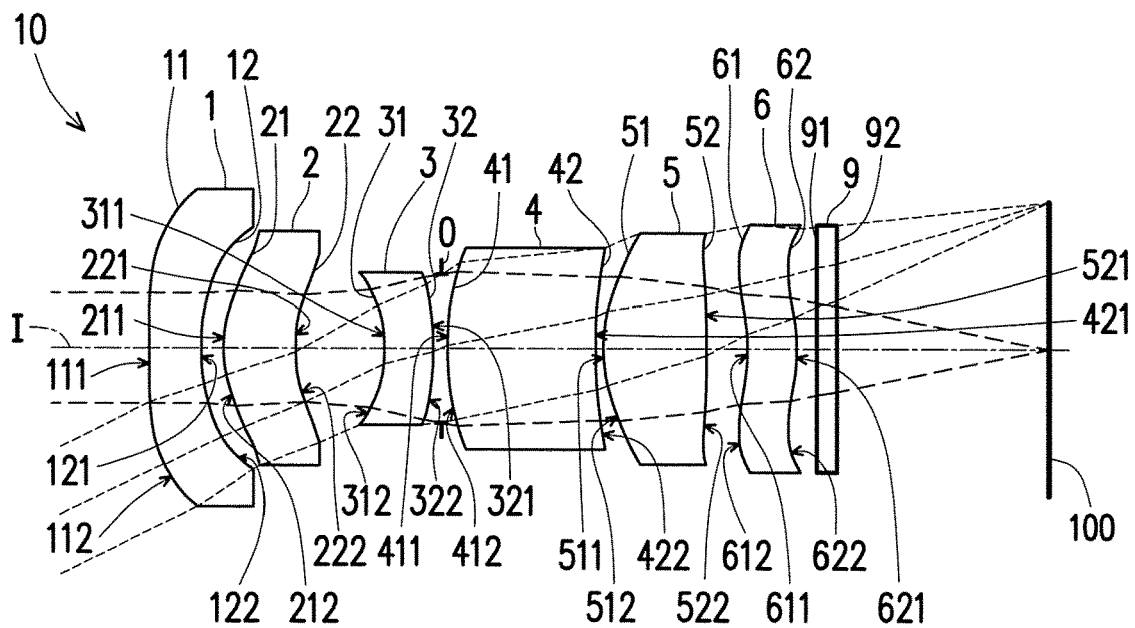
FIG. 6
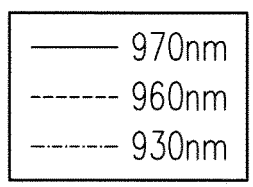
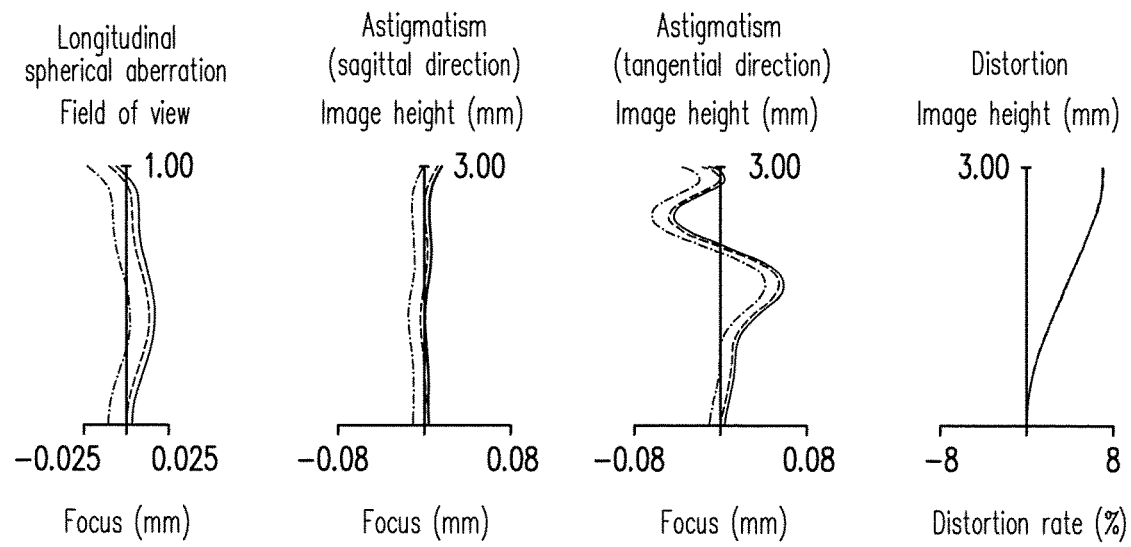
FIG. 7A  FIG. 7B  FIG. 7C  FIG. 7D

| First embodiment |||||||
|---|---|---|---|---|---|---|
| EFL= 5.780 mm, HFOV= 25.765°, TTL=18.487 mm, Fno= 2.5 |||||||
| element | Surface | Radius of curvature (mm) | Thickness (mm) | Refractive index | Abbe number | Focal length (mm) |
| Object | | | Infinite | | | |
| First lens element 1 | Object-side surface 11 | -400.290 | 1.063 | 1.526 | 56.150 | -7.489 |
| | Image-side surface 12 | 3.983 | 0.457 | | | |
| Second lens element 2 | Object-side surface 21 | 2.244 | 1.471 | 1.526 | 56.150 | 10.850 |
| | Image-side surface 22 | 2.863 | 1.831 | | | |
| Third lens element 3 | Object-side surface 31 | -2.481 | 1.000 | 1.526 | 56.150 | -9.129 |
| | Image-side surface 32 | -5.844 | 0.150 | | | |
| Aperture stop 0 | | | 0.150 | | | |
| Fourth lens element 4 | Object-side surface 41 | 5.942 | 3.034 | 1.884 | 20.879 | 11.237 |
| | Image-side surface 42 | 11.235 | 0.150 | | | |
| Fifth lens element 5 | Object-side surface 51 | 2.887 | 2.135 | 1.526 | 56.150 | 5.018 |
| | Image-side surface 52 | -22.986 | 0.851 | | | |
| Sixth lens element 6 | Object-side surface 61 | -4.040 | 1.006 | 1.526 | 56.150 | 90.390 |
| | Image-side surface 62 | -4.043 | 0.425 | | | |
| Light filter 9 | Object-side surface 91 | Infinite | 0.400 | 1.508 | 64.166 | |
| | Image-side surface 92 | Infinite | 4.363 | | | |
| | Image plane 100 | Infinite | | | | |

FIG. 8

| Surface | K | a4 | a6 | a8 | a10 |
|---|---|---|---|---|---|
| 11 | 0.000000E+00 | 1.314888E-02 | -1.137991E-03 | 1.630176E-04 | -1.745949E-05 |
| 12 | 0.000000E+00 | -1.976587E-02 | 1.243826E-02 | -3.688929E-03 | 7.317677E-04 |
| 21 | -1.035960E+00 | -3.405613E-02 | 1.084380E-02 | -3.446484E-03 | 7.724042E-04 |
| 22 | 0.000000E+00 | -1.318987E-02 | -5.005494E-04 | -4.113287E-04 | 2.874293E-04 |
| 31 | 0.000000E+00 | 1.303902E-02 | -2.189292E-03 | 2.513644E-04 | 4.341715E-04 |
| 32 | 0.000000E+00 | -2.395465E-03 | -7.454461E-04 | 4.573731E-04 | -8.444098E-05 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 0.000000E+00 | -1.481656E-02 | 4.332435E-04 | -1.639044E-04 | 3.624783E-05 |
| 52 | 0.000000E+00 | -1.022354E-04 | -1.260245E-03 | 7.364571E-04 | -1.046576E-04 |
| 61 | -1.154428E+01 | -1.852424E-04 | 5.295557E-03 | -6.863421E-04 | 2.863308E-05 |
| 62 | 0.000000E+00 | 2.123046E-02 | 8.263254E-04 | 3.025524E-04 | -9.981998E-05 |

| Surface | a12 | a14 | a16 |
|---|---|---|---|
| 11 | 1.166631E-06 | -3.135579E-08 | 0.000000E+00 |
| 12 | -7.922009E-05 | 3.554280E-06 | 0.000000E+00 |
| 21 | -1.022971E-04 | 5.584219E-06 | 0.000000E+00 |
| 22 | -1.200126E-04 | 1.422740E-05 | 0.000000E+00 |
| 31 | -2.244241E-04 | 2.951315E-05 | 0.000000E+00 |
| 32 | 2.771005E-07 | 0.000000E+00 | 0.000000E+00 |
| 41 | 0.000000E+00 | 0.000000E+00 | 0.000000E+00 |
| 42 | 0.000000E+00 | 0.000000E+00 | 0.000000E+00 |
| 51 | -3.276335E-06 | 0.000000E+00 | 0.000000E+00 |
| 52 | 6.258718E-06 | 0.000000E+00 | 0.000000E+00 |
| 61 | 0.000000E+00 | 0.000000E+00 | 0.000000E+00 |
| 62 | 6.176302E-06 | 0.000000E+00 | 0.000000E+00 |

FIG. 9

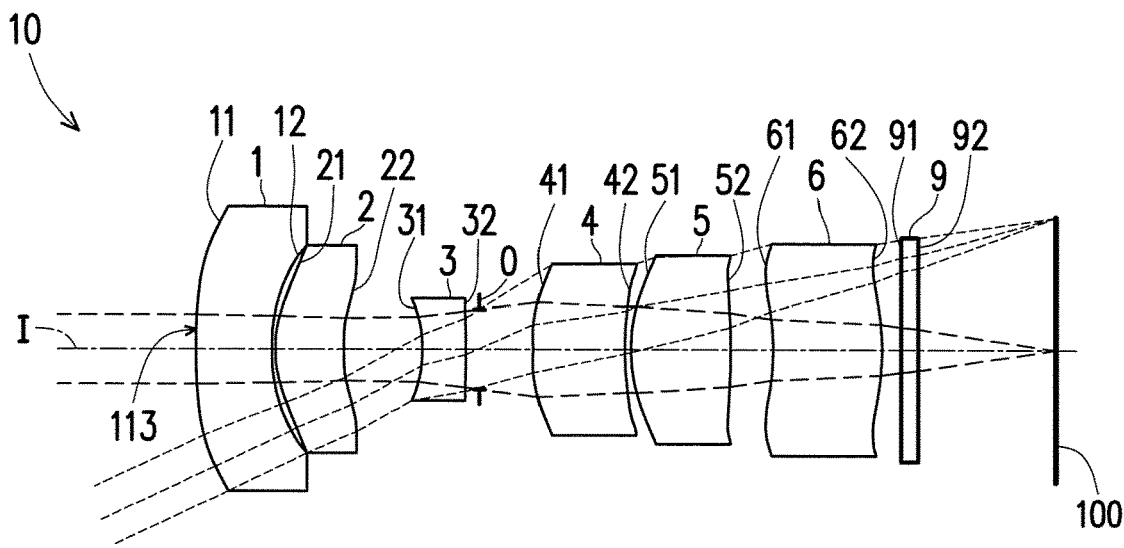
FIG. 10
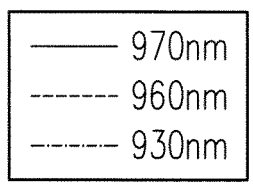
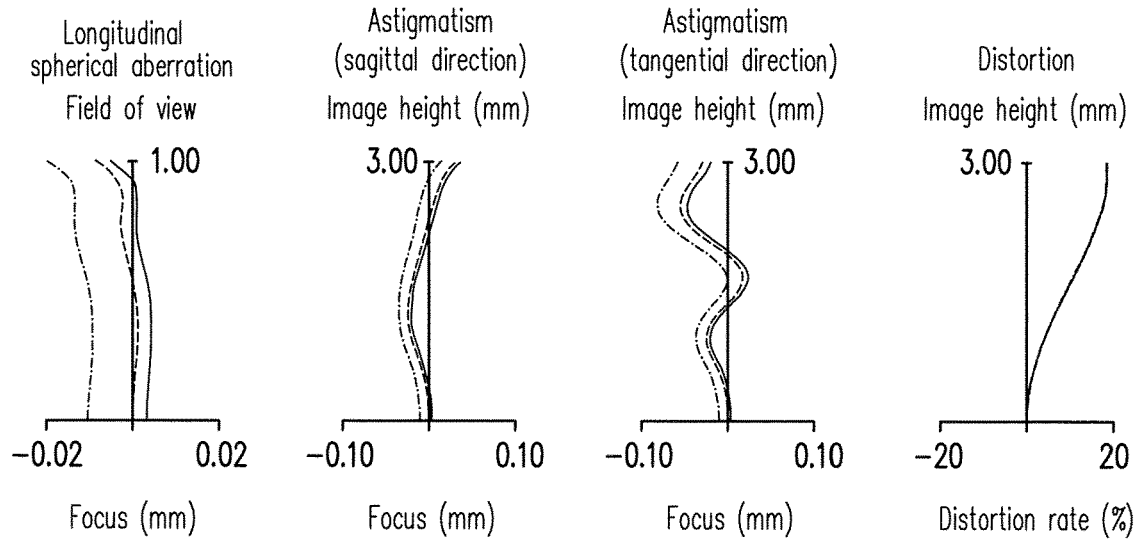
FIG. 11A   FIG. 11B   FIG. 11C   FIG. 11D

| Second embodiment ||||||
|---|---|---|---|---|---|
| EFL= 5.415 mm, HFOV= 25.025°, TTL= 19.609 mm, Fno= 3.5 ||||||
| element | Surface | Radius of curvature (mm) | Thickness (mm) | Refractive index | Abbe number | Focal length (mm) |
| Object | | | Infinite | | | |
| First lens element 1 | Object-side surface 11 | 52.450 | 1.703 | 1.526 | 56.150 | -7.855 |
| | Image-side surface 12 | 3.788 | 0.059 | | | |
| Second lens element 2 | Object-side surface 21 | 2.300 | 1.564 | 1.526 | 56.150 | 8.779 |
| | Image-side surface 22 | 3.507 | 1.805 | | | |
| Third lens element 3 | Object-side surface 31 | -3.110 | 1.000 | 1.526 | 56.150 | -6.756 |
| | Image-side surface 32 | -27.604 | 0.305 | | | |
| Aperture stop 0 | | | 1.215 | | | |
| Fourth lens element 4 | Object-side surface 41 | 4.457 | 2.099 | 1.884 | 20.879 | 10.167 |
| | Image-side surface 42 | 6.884 | 0.150 | | | |
| Fifth lens element 5 | Object-side surface 51 | 3.110 | 2.271 | 1.526 | 56.150 | 5.008 |
| | Image-side surface 52 | -12.910 | 0.978 | | | |
| Sixth lens element 6 | Object-side surface 61 | -4.709 | 2.486 | 1.526 | 56.150 | 22.775 |
| | Image-side surface 62 | -3.996 | 0.425 | | | |
| Light filter 9 | Object-side surface 91 | Infinite | 0.400 | 1.508 | 64.166 | |
| | Image-side surface 92 | Infinite | 3.147 | | | |
| | Image plane 100 | Infinite | 0.000 | | | |

FIG. 12

| Surface | K | a4 | a6 | a8 | a10 |
|---|---|---|---|---|---|
| 11 | 0.000000E+00 | 1.150835E-02 | -1.228744E-03 | 1.639547E-04 | -1.737083E-05 |
| 12 | 0.000000E+00 | -1.977031E-02 | 1.210388E-02 | -3.723993E-03 | 7.290749E-04 |
| 21 | -1.035960E+00 | -3.358972E-02 | 1.102329E-02 | -3.459557E-03 | 7.691829E-04 |
| 22 | 0.000000E+00 | -1.424636E-02 | -8.882421E-04 | -3.656660E-04 | 2.770586E-04 |
| 31 | 0.000000E+00 | -6.580088E-03 | -1.319024E-03 | 1.612003E-03 | -3.998721E-04 |
| 32 | 0.000000E+00 | -1.046720E-02 | -3.627343E-04 | 2.654337E-03 | 7.400230E-04 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 0.000000E+00 | -1.338962E-02 | 5.311169E-04 | -1.218718E-04 | 4.330933E-05 |
| 52 | 0.000000E+00 | 2.824326E-03 | -3.120626E-04 | 7.738120E-04 | -1.161547E-04 |
| 61 | -1.154428E+01 | -1.121492E-03 | 5.112304E-03 | -6.750215E-04 | 3.252797E-05 |
| 62 | 0.000000E+00 | 1.545640E-02 | 7.921135E-04 | 3.474901E-04 | -9.444859E-05 |

| Surface | a12 | a14 | a16 |
|---|---|---|---|
| 11 | 1.141732E-06 | -3.677431E-08 | 0.000000E+00 |
| 12 | -8.023667E-05 | 3.352220E-06 | 0.000000E+00 |
| 21 | -1.022802E-04 | 5.695109E-06 | 0.000000E+00 |
| 22 | -1.205241E-04 | 1.731886E-05 | 0.000000E+00 |
| 31 | -8.977505E-04 | 3.750856E-04 | 0.000000E+00 |
| 32 | -2.053733E-03 | 0.000000E+00 | 0.000000E+00 |
| 41 | 0.000000E+00 | 0.000000E+00 | 0.000000E+00 |
| 42 | 0.000000E+00 | 0.000000E+00 | 0.000000E+00 |
| 51 | -6.168715E-06 | 0.000000E+00 | 0.000000E+00 |
| 52 | 7.274470E-06 | 0.000000E+00 | 0.000000E+00 |
| 61 | 0.000000E+00 | 0.000000E+00 | 0.000000E+00 |
| 62 | 5.694613E-06 | 0.000000E+00 | 0.000000E+00 |

FIG. 13

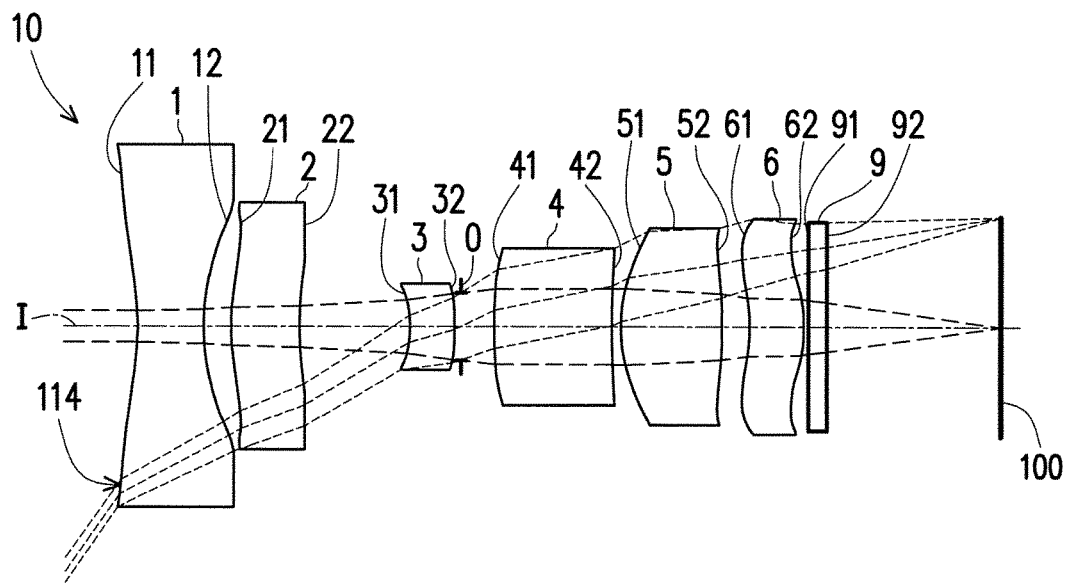
FIG. 14
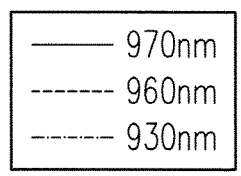
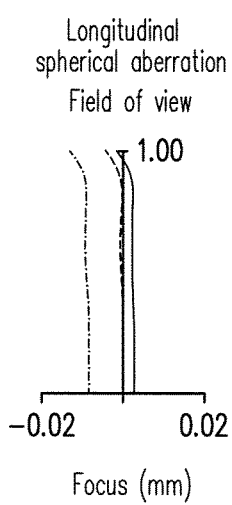
Longitudinal spherical aberration
Field of view
FIG. 15A
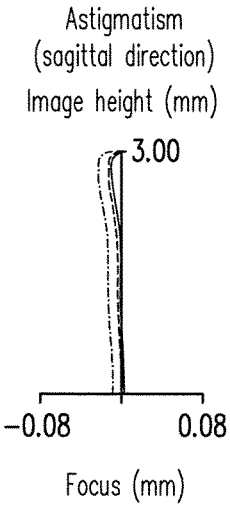
Astigmatism (sagittal direction)
Image height (mm)
FIG. 15B
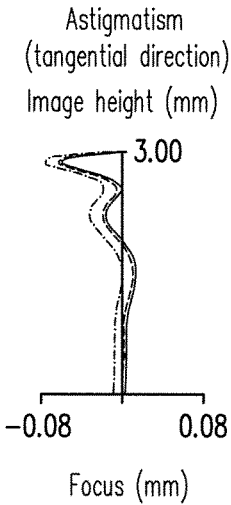
Astigmatism (tangential direction)
Image height (mm)
FIG. 15C
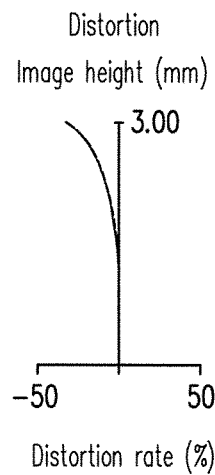
Distortion
Image height (mm)
FIG. 15D

| Third embodiment ||||||
|---|---|---|---|---|---|
| EFL= 3.105 mm, HFOV=55.052 °, TTL= 23.657 mm, Fno= 3.5 ||||||
| element | Surface | Radius of curvature (mm) | Thickness (mm) | Refractive index | Abbe number | Focal length (mm) |
| Object | | | Infinite | | | |
| First lens element 1 | Object-side surface 11 | -7.260 | 1.803 | 1.526 | 56.150 | -5.696 |
| | Image-side surface 12 | 5.540 | 0.738 | | | |
| Second lens element 2 | Object-side surface 21 | 5.420 | 1.907 | 1.526 | 56.150 | 20.826 |
| | Image-side surface 22 | 9.424 | 3.010 | | | |
| Third lens element 3 | Object-side surface 31 | -3.101 | 1.220 | 1.521 | 54.921 | -13.193 |
| | Image-side surface 32 | -6.408 | 0.154 | | | |
| Aperture stop 0 | | | 0.923 | | | |
| Fourth lens element 4 | Object-side surface 41 | 9.550 | 3.240 | 1.884 | 20.879 | 15.710 |
| | Image-side surface 42 | 25.680 | 0.243 | | | |
| Fifth lens element 5 | Object-side surface 51 | 3.806 | 2.755 | 1.526 | 56.150 | 6.079 |
| | Image-side surface 52 | -15.034 | 0.773 | | | |
| Sixth lens element 6 | Object-side surface 61 | -4.932 | 1.483 | 1.526 | 56.150 | 22.002 |
| | Image-side surface 62 | -3.817 | 0.150 | | | |
| Light filter 9 | Object-side surface 91 | Infinite | 0.484 | 1.508 | 64.166 | |
| | Image-side surface 92 | Infinite | 4.775 | | | |
| | Image plane 100 | Infinite | | | | |

FIG. 16

| Surface | K | a4 | a6 | a8 | a10 |
|---|---|---|---|---|---|
| 11 | 0.000000E+00 | 6.002191E-03 | -4.044783E-04 | 2.588170E-05 | -1.176096E-06 |
| 12 | 0.000000E+00 | -9.951338E-03 | 2.633088E-03 | -4.585820E-04 | 5.860153E-05 |
| 21 | -1.035960E+00 | -1.716600E-02 | 3.012015E-03 | -4.136773E-04 | 3.803426E-05 |
| 22 | 0.000000E+00 | -8.041020E-03 | 1.991206E-03 | -7.074716E-04 | 1.381499E-04 |
| 31 | 0.000000E+00 | -1.142319E-02 | 2.812118E-05 | 2.755332E-03 | -2.080598E-03 |
| 32 | 0.000000E+00 | -1.109668E-02 | 5.201691E-04 | 2.553054E-03 | -2.515909E-03 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 0.000000E+00 | -7.201401E-03 | 2.180921E-04 | -3.704704E-05 | 7.801011E-06 |
| 52 | 0.000000E+00 | 1.029124E-03 | -3.956713E-04 | 1.900053E-04 | -1.883946E-05 |
| 61 | -1.154428E+01 | 2.392834E-04 | 2.070908E-03 | -1.746719E-04 | 5.507295E-06 |
| 62 | 0.000000E+00 | 1.228488E-02 | 3.647907E-04 | 8.576543E-05 | -1.725596E-05 |

| Surface | a12 | a14 | a16 |
|---|---|---|---|
| 11 | 3.031113E-08 | -3.318861E-10 | 0.000000E+00 |
| 12 | -4.616207E-06 | 1.457752E-07 | 0.000000E+00 |
| 21 | -2.361456E-06 | 7.284963E-08 | 0.000000E+00 |
| 22 | -1.354222E-05 | 5.355750E-07 | 0.000000E+00 |
| 31 | 6.533185E-04 | -7.048818E-05 | 0.000000E+00 |
| 32 | 8.067948E-04 | 0.000000E+00 | 0.000000E+00 |
| 41 | 0.000000E+00 | 0.000000E+00 | 0.000000E+00 |
| 42 | 0.000000E+00 | 0.000000E+00 | 0.000000E+00 |
| 51 | -4.408111E-07 | 0.000000E+00 | 0.000000E+00 |
| 52 | 9.017619E-07 | 0.000000E+00 | 0.000000E+00 |
| 61 | 0.000000E+00 | 0.000000E+00 | 0.000000E+00 |
| 62 | 8.582316E-07 | 0.000000E+00 | 0.000000E+00 |

FIG. 17

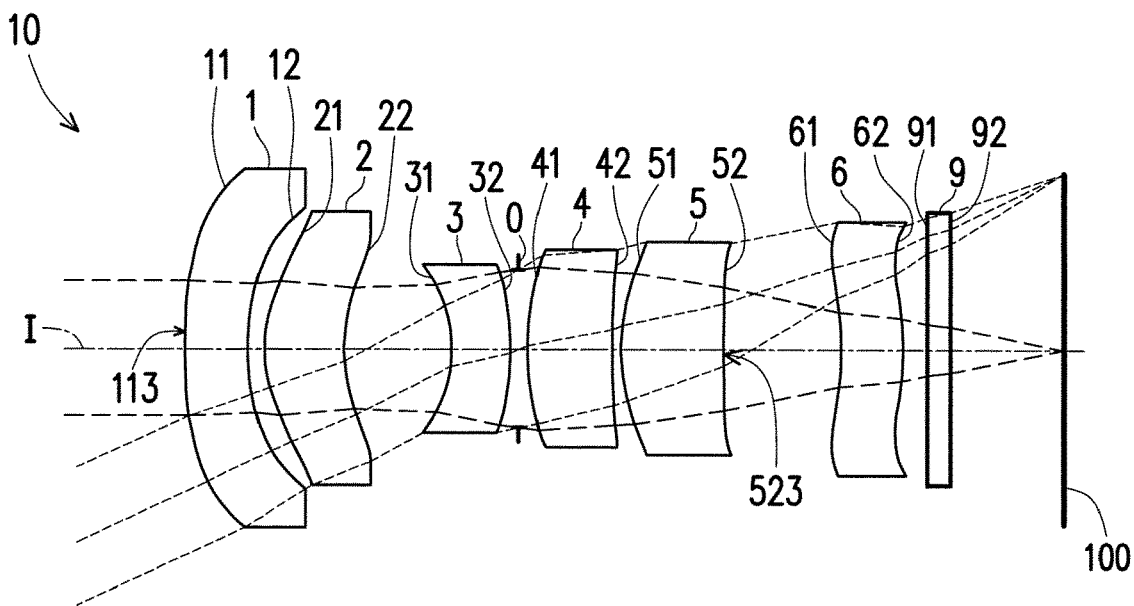
FIG. 18
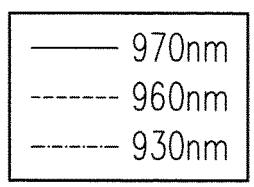
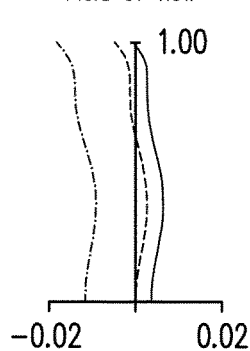
FIG. 19A
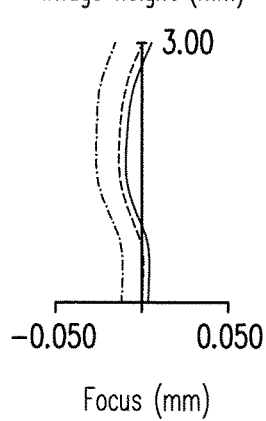
FIG. 19B
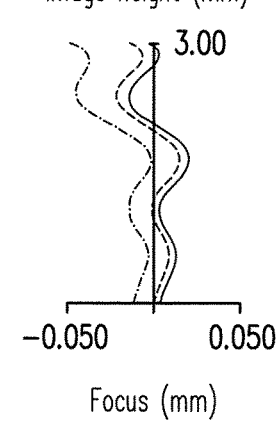
FIG. 19C
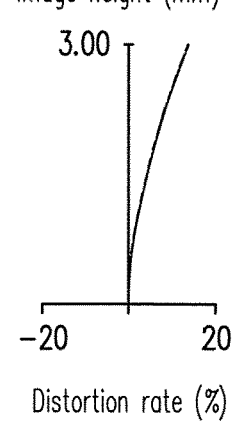
FIG. 19D

| Fourth embodiment | | | | | | |
|---|---|---|---|---|---|---|
| EFL= 5.736 mm, HFOV= 24.587°, TTL= 14.985 mm, Fno= 2.5 | | | | | | |
| element | Surface | Radius of curvature (mm) | Thickness (mm) | Refractive index | Abbe number | Focal length (mm) |
| Object | | | Infinite | | | |
| First lens element 1 | Object-side surface 11 | 30.981 | 1.022 | 1.526 | 56.150 | -8.583 |
| | Image-side surface 12 | 3.896 | 0.288 | | | |
| Second lens element 2 | Object-side surface 21 | 2.119 | 1.363 | 1.526 | 56.150 | 9.607 |
| | Image-side surface 22 | 2.840 | 1.841 | | | |
| Third lens element 3 | Object-side surface 31 | -2.124 | 1.000 | 1.526 | 56.150 | -7.763 |
| | Image-side surface 32 | -5.145 | 0.150 | | | |
| Aperture stop 0 | | | 0.150 | | | |
| Fourth lens element 4 | Object-side surface 41 | 4.761 | 1.440 | 1.884 | 20.879 | 7.287 |
| | Image-side surface 42 | 15.635 | 0.150 | | | |
| Fifth lens element 5 | Object-side surface 51 | 3.134 | 1.747 | 1.526 | 56.150 | 6.328 |
| | Image-side surface 52 | 43.068 | 2.024 | | | |
| Sixth lens element 6 | Object-side surface 61 | -4.505 | 1.055 | 1.526 | 56.150 | 63.615 |
| | Image-side surface 62 | -4.291 | 0.425 | | | |
| Light filter 9 | Object-side surface 91 | Infinite | 0.400 | 1.508 | 64.166 | |
| | Image-side surface 92 | Infinite | 1.929 | | | |
| | Image plane 100 | Infinite | | | | |

FIG. 20

| Surface | K | a4 | a6 | a8 | a10 |
|---|---|---|---|---|---|
| 11 | 0.000000E+00 | 1.316450E-02 | -1.170094E-03 | 1.672180E-04 | -1.700230E-05 |
| 12 | 0.000000E+00 | -1.969051E-02 | 1.242054E-02 | -3.683937E-03 | 7.331148E-04 |
| 21 | -1.035960E+00 | -3.445656E-02 | 1.097825E-02 | -3.449606E-03 | 7.709382E-04 |
| 22 | 0.000000E+00 | -1.496937E-02 | -1.042678E-03 | -4.015529E-04 | 2.986305E-04 |
| 31 | 0.000000E+00 | 1.785501E-02 | -2.102114E-03 | 3.192796E-04 | 4.060968E-04 |
| 32 | 0.000000E+00 | -4.401167E-03 | -4.444053E-04 | 3.736727E-04 | -1.100318E-04 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 0.000000E+00 | -1.562614E-02 | 1.554248E-03 | -1.313615E-04 | 2.438588E-05 |
| 52 | 0.000000E+00 | 4.688307E-03 | -6.441693E-05 | 7.127132E-04 | -1.164571E-04 |
| 61 | -1.154428E+01 | -2.622059E-04 | 5.372207E-03 | -6.279119E-04 | 3.140341E-05 |
| 62 | 0.000000E+00 | 2.228811E-02 | 1.104120E-03 | 3.599790E-04 | -9.150330E-05 |
| Surface | a12 | a14 | a16 | | |
| 11 | 1.170982E-06 | -3.496863E-08 | 0.000000E+00 | | |
| 12 | -7.925478E-05 | 3.517896E-06 | 0.000000E+00 | | |
| 21 | -1.022071E-04 | 5.643212E-06 | 0.000000E+00 | | |
| 22 | -1.146870E-04 | 1.334497E-05 | 0.000000E+00 | | |
| 31 | -2.652798E-04 | 5.684113E-05 | 0.000000E+00 | | |
| 32 | 8.314841E-06 | 0.000000E+00 | 0.000000E+00 | | |
| 41 | 0.000000E+00 | 0.000000E+00 | 0.000000E+00 | | |
| 42 | 0.000000E+00 | 0.000000E+00 | 0.000000E+00 | | |
| 51 | -2.175535E-06 | 0.000000E+00 | 0.000000E+00 | | |
| 52 | 1.857832E-05 | 0.000000E+00 | 0.000000E+00 | | |
| 61 | 0.000000E+00 | 0.000000E+00 | 0.000000E+00 | | |
| 62 | 7.334445E-06 | 0.000000E+00 | 0.000000E+00 | | |

FIG. 21

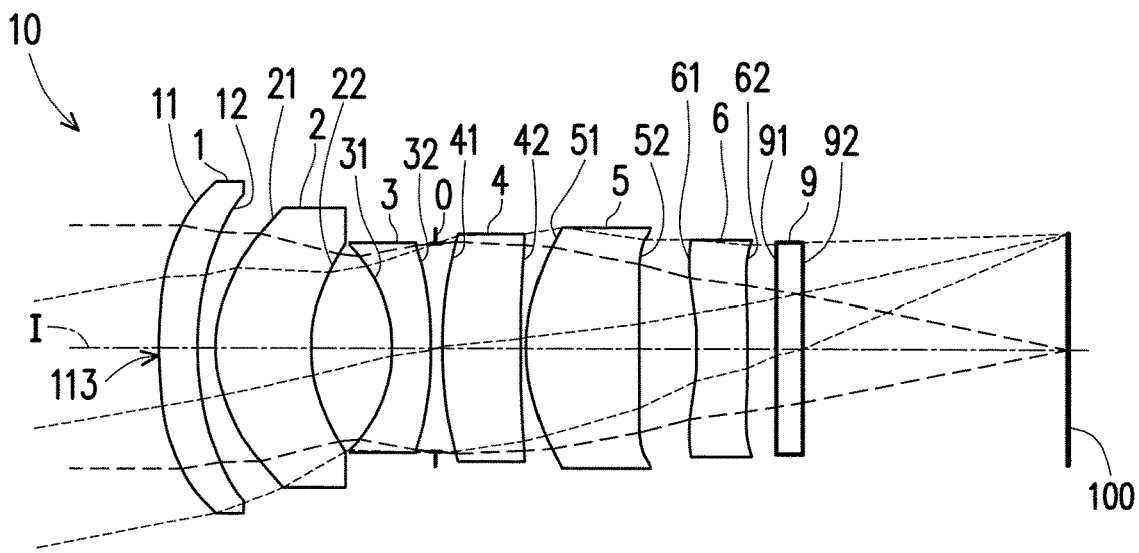
FIG. 22
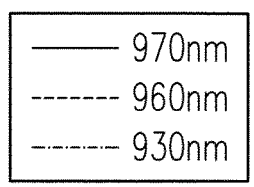
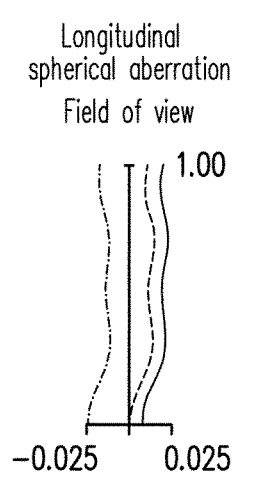
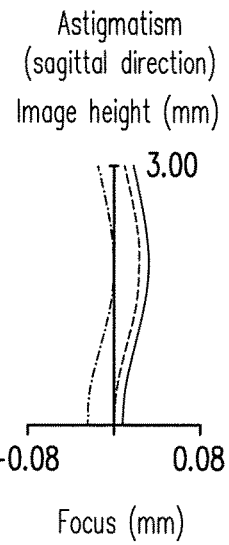
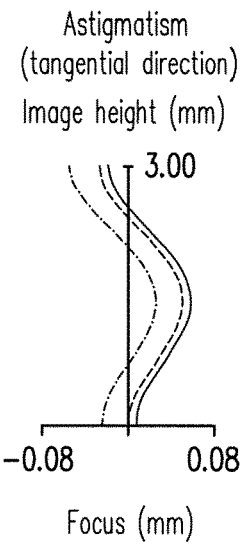
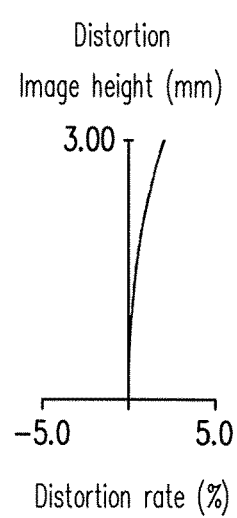
FIG. 23A    FIG. 23B    FIG. 23C    FIG. 23D

| Fifth embodiment ||||||
|---|---|---|---|---|---|
| EFL= 15.762 mm, HFOV= 10.363 °, TTL= 23.644 mm, Fno= 2.5 ||||||
| element | Surface | Radius of curvature (mm) | Thickness (mm) | Refractive index | Abbe number | Focal length (mm) |
| Object | | | Infinite | | | |
| First lens element 1 | Object-side surface 11 | 14.072 | 1.000 | 1.526 | 56.150 | -29.234 |
| | Image-side surface 12 | 7.169 | 0.477 | | | |
| Second lens element 2 | Object-side surface 21 | 3.266 | 2.473 | 1.526 | 56.150 | 17.022 |
| | Image-side surface 22 | 3.798 | 2.124 | | | |
| Third lens element 3 | Object-side surface 31 | -3.469 | 1.000 | 1.526 | 56.150 | -10.411 |
| | Image-side surface 32 | -10.402 | 0.150 | | | |
| Aperture stop 0 | | | 0.150 | | | |
| Fourth lens element 4 | Object-side surface 41 | 10.726 | 2.032 | 1.884 | 20.879 | 16.646 |
| | Image-side surface 42 | 36.008 | 0.150 | | | |
| Fifth lens element 5 | Object-side surface 51 | 4.785 | 2.947 | 1.526 | 56.150 | 9.055 |
| | Image-side surface 52 | -885.028 | 1.500 | | | |
| Sixth lens element 6 | Object-side surface 61 | -8.294 | 1.317 | 1.526 | 56.150 | -30.959 |
| | Image-side surface 62 | -17.823 | 0.741 | | | |
| Light filter 9 | Object-side surface 91 | Infinite | 0.697 | 1.508 | 64.166 | |
| | Image-side surface 92 | Infinite | 6.887 | | | |
| | Image plane 100 | Infinite | | | | |

FIG. 24

| Surface | K | a4 | a6 | a8 | a10 |
|---|---|---|---|---|---|
| 11 | 0.000000E+00 | 2.634747E-03 | -6.648278E-05 | 3.704270E-06 | -9.937014E-08 |
| 12 | 0.000000E+00 | -3.882564E-03 | 7.551676E-04 | -7.638105E-05 | 4.946022E-06 |
| 21 | -1.035960E+00 | -5.687783E-03 | 7.115475E-04 | -7.002356E-05 | 5.227772E-06 |
| 22 | 0.000000E+00 | -3.913502E-03 | -1.443897E-04 | -3.443010E-06 | 2.568133E-06 |
| 31 | 0.000000E+00 | 3.464862E-03 | -2.292021E-04 | 1.526484E-05 | 4.504988E-06 |
| 32 | 0.000000E+00 | -6.595788E-04 | -6.030610E-05 | 1.190868E-05 | -2.247357E-07 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 0.000000E+00 | -3.405699E-03 | 1.144157E-04 | -2.571376E-06 | 2.467449E-07 |
| 52 | 0.000000E+00 | 7.446316E-04 | 4.641591E-06 | 2.390757E-05 | -5.874890E-07 |
| 61 | -1.154428E+01 | 8.915724E-04 | 3.891208E-04 | -4.304642E-06 | -2.174612E-07 |
| 62 | 0.000000E+00 | 4.137053E-03 | 1.467342E-04 | 7.130977E-06 | -1.499634E-06 |

| Surface | a12 | a14 | a16 |
|---|---|---|---|
| 11 | 3.164574E-09 | -6.481819E-11 | 0.000000E+00 |
| 12 | -1.776746E-07 | 2.470247E-09 | 0.000000E+00 |
| 21 | -2.231015E-07 | 4.406047E-09 | 0.000000E+00 |
| 22 | -2.667480E-07 | 9.161170E-09 | 0.000000E+00 |
| 31 | -5.198249E-07 | 2.698089E-08 | 0.000000E+00 |
| 32 | -8.390889E-09 | 0.000000E+00 | 0.000000E+00 |
| 41 | 0.000000E+00 | 0.000000E+00 | 0.000000E+00 |
| 42 | 0.000000E+00 | 0.000000E+00 | 0.000000E+00 |
| 51 | -5.602627E-09 | 0.000000E+00 | 0.000000E+00 |
| 52 | 6.348290E-08 | 0.000000E+00 | 0.000000E+00 |
| 61 | 0.000000E+00 | 0.000000E+00 | 0.000000E+00 |
| 62 | 6.215579E-08 | 0.000000E+00 | 0.000000E+00 |

FIG. 25

| Sixth embodiment | | | | | | |
|---|---|---|---|---|---|---|
| EFL= 9.414 mm, HFOV= 17.253 °, TTL= 34.914 mm, Fno= 2.5 | | | | | | |
| element | Surface | Radius of curvature (mm) | Thickness (mm) | Refractive index | Abbe number | Focal length (mm) |
| Object | | | Infinite | | | |
| First lens element 1 | Object-side surface 11 | 49.176 | 2.337 | 1.526 | 56.150 | -18.341 |
| | Image-side surface 12 | 7.935 | 0.183 | | | |
| Second lens element 2 | Object-side surface 21 | 3.950 | 1.790 | 1.526 | 56.150 | 29.668 |
| | Image-side surface 22 | 4.462 | 9.975 | | | |
| Third lens element 3 | Object-side surface 31 | -3.989 | 1.209 | 1.526 | 56.150 | -13.663 |
| | Image-side surface 32 | -9.902 | 0.150 | | | |
| Aperture stop 0 | | | 0.150 | | | |
| Fourth lens element 4 | Object-side surface 41 | 16.408 | 3.524 | 1.884 | 20.879 | 15.413 |
| | Image-side surface 42 | -72.446 | 0.150 | | | |
| Fifth lens element 5 | Object-side surface 51 | 5.347 | 2.872 | 1.526 | 56.150 | 10.277 |
| | Image-side surface 52 | 390.388 | 2.323 | | | |
| Sixth lens element 6 | Object-side surface 61 | -7.612 | 1.476 | 1.526 | 56.150 | -196.636 |
| | Image-side surface 62 | -8.766 | 0.765 | | | |
| Light filter 9 | Object-side surface 91 | Infinite | 0.720 | 1.508 | 64.166 | |
| | Image-side surface 92 | Infinite | 7.288 | | | |
| | Image plane 100 | Infinite | | | | |

FIG. 28

| Surface | K | a4 | a6 | a8 | a10 |
|---|---|---|---|---|---|
| 11 | 0.000000E+00 | 2.068745E-03 | -6.692880E-05 | 2.637463E-06 | -8.470058E-08 |
| 12 | 0.000000E+00 | -3.222792E-03 | 6.376418E-04 | -6.104409E-05 | 3.655770E-06 |
| 21 | -1.035960E+00 | -5.854871E-03 | 5.992284E-04 | -5.597916E-05 | 3.889735E-06 |
| 22 | 0.000000E+00 | -2.158413E-03 | -4.131602E-05 | -3.470075E-06 | 1.712396E-06 |
| 31 | 0.000000E+00 | 3.889234E-03 | -1.862554E-04 | 5.973619E-06 | 2.624190E-06 |
| 32 | 0.000000E+00 | -1.021869E-03 | -5.976842E-05 | 6.452001E-06 | -4.911111E-07 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 0.000000E+00 | -3.065309E-03 | 3.713476E-05 | -1.686581E-06 | 2.539249E-07 |
| 52 | 0.000000E+00 | 1.035989E-04 | -3.053165E-05 | 1.484429E-05 | -4.153597E-07 |
| 61 | -1.154428E+01 | 8.732795E-04 | 3.491671E-04 | -6.346316E-06 | 8.949868E-08 |
| 62 | 0.000000E+00 | 3.626724E-03 | 8.306885E-05 | 5.682957E-06 | -5.485049E-07 |

| Surface | a12 | a14 | a16 |
|---|---|---|---|
| 11 | 1.886521E-09 | -1.583963E-11 | 0.000000E+00 |
| 12 | -1.235832E-07 | 1.848623E-09 | 0.000000E+00 |
| 21 | -1.598844E-07 | 2.662640E-09 | 0.000000E+00 |
| 22 | -1.800752E-07 | 4.824948E-09 | 0.000000E+00 |
| 31 | -4.004373E-07 | 1.734995E-08 | 0.000000E+00 |
| 32 | 1.052446E-08 | 0.000000E+00 | 0.000000E+00 |
| 41 | 0.000000E+00 | 0.000000E+00 | 0.000000E+00 |
| 42 | 0.000000E+00 | 0.000000E+00 | 0.000000E+00 |
| 51 | -5.106548E-09 | 0.000000E+00 | 0.000000E+00 |
| 52 | 2.511570E-08 | 0.000000E+00 | 0.000000E+00 |
| 61 | 0.000000E+00 | 0.000000E+00 | 0.000000E+00 |
| 62 | 4.786850E-08 | 0.000000E+00 | 0.000000E+00 |

FIG. 29

| Optical parameters | First embodiment | Second embodiment | Third embodiment | Fourth embodiment | Fifth embodiment | Sixth embodiment |
|---|---|---|---|---|---|---|
| T1 | 1.063 | 1.703 | 1.803 | 1.022 | 1.000 | 2.337 |
| G12 | 0.457 | 0.059 | 0.738 | 0.288 | 0.477 | 0.183 |
| T2 | 1.471 | 1.564 | 1.907 | 1.363 | 2.473 | 1.790 |
| G23 | 1.831 | 1.805 | 3.010 | 1.841 | 2.124 | 9.975 |
| T3 | 1.000 | 1.000 | 1.220 | 1.000 | 1.000 | 1.209 |
| G34 | 0.300 | 1.520 | 1.077 | 0.300 | 0.300 | 0.300 |
| T4 | 3.034 | 2.099 | 3.240 | 1.440 | 2.032 | 3.524 |
| G45 | 0.150 | 0.150 | 0.243 | 0.150 | 0.150 | 0.150 |
| T5 | 2.135 | 2.271 | 2.755 | 1.747 | 2.947 | 2.872 |
| G56 | 0.851 | 0.978 | 0.773 | 2.024 | 1.500 | 2.323 |
| T6 | 1.006 | 2.486 | 1.483 | 1.055 | 1.317 | 1.476 |
| G6F | 0.425 | 0.425 | 0.150 | 0.425 | 0.741 | 0.765 |
| TF | 0.400 | 0.400 | 0.484 | 0.400 | 0.697 | 0.720 |
| GFP | 4.363 | 3.147 | 4.775 | 1.929 | 6.887 | 7.288 |
| AAG | 3.589 | 4.513 | 5.841 | 4.604 | 4.551 | 12.932 |
| ALT | 9.710 | 11.123 | 12.408 | 7.627 | 10.768 | 13.209 |
| BFL | 5.188 | 3.973 | 5.409 | 2.754 | 8.325 | 8.774 |
| TTL | 18.487 | 19.609 | 23.657 | 14.985 | 23.644 | 34.914 |
| TL | 13.299 | 15.636 | 18.249 | 12.231 | 15.319 | 26.140 |
| EFL | 5.780 | 5.415 | 3.105 | 5.736 | 15.762 | 9.414 |
| (G12+G34+G45+G56)/G23 | 0.960 | 1.500 | 0.940 | 1.500 | 1.143 | 0.296 |
| ALT/T4 | 3.200 | 5.300 | 3.830 | 5.298 | 5.300 | 3.748 |
| TTL/G23 | 10.096 | 10.863 | 7.860 | 8.138 | 11.133 | 3.500 |
| TL/(T1+G12+T2+G23+T3) | 2.284 | 2.550 | 2.103 | 2.218 | 2.166 | 1.687 |
| (T1+G12+T2)/T6 | 2.971 | 1.338 | 3.000 | 2.533 | 3.000 | 2.920 |
| TTL/EFL | 3.199 | 3.621 | 7.620 | 2.612 | 1.500 | 3.709 |
| ALT/BFL | 1.872 | 2.800 | 2.294 | 2.770 | 1.293 | 1.505 |
| AAG/G23 | 1.960 | 2.500 | 1.940 | 2.500 | 2.143 | 1.296 |
| TTL/AAG | 5.152 | 4.345 | 4.051 | 3.255 | 5.195 | 2.700 |
| (T4+G45+T5+G56+T6)/AAG | 2.000 | 1.769 | 1.454 | 1.394 | 1.746 | 0.800 |
| TL/BFL | 2.563 | 3.936 | 3.374 | 4.441 | 1.840 | 2.979 |
| (T4+G45+T5)/T2 | 3.616 | 2.889 | 3.270 | 2.448 | 2.074 | 3.657 |
| (T4+G45+T5)/T5 | 2.491 | 1.990 | 2.264 | 1.910 | 1.740 | 2.279 |
| (T4+G45+T5+G56+T6)/(T1+G12+T2) | 2.400 | 2.400 | 1.910 | 2.400 | 2.011 | 2.400 |
| (T1+G12+T2+G23+T3)/BFL | 1.122 | 1.544 | 1.604 | 2.003 | 0.850 | 1.766 |
| (T3+G34+T4+G45+T5)/T2 | 4.500 | 4.500 | 4.474 | 3.402 | 2.600 | 4.500 |
| (T3+G34+T4+G45+T5)/G23 | 3.615 | 3.900 | 2.836 | 2.518 | 3.027 | 0.807 |
| (T3+G34+T4+G45+T5)/T5 | 3.100 | 3.100 | 3.098 | 2.654 | 2.181 | 2.805 |

FIG. 30

OPTICAL IMAGING LENS

CROSS-REFERENCE TO RELATED APPLICATION

This application claims the priority benefit of Chinese application serial no. 201710950363.5, filed on Oct. 13, 2017. The entirety of the above-mentioned patent application is hereby incorporated by reference herein and made a part of this specification.

BACKGROUND OF THE INVENTION

1. Field of the Invention

The invention relates to an optical element. More particularly, the invention relates to an optical imaging lens.

2. Description of Related Art

The specification of consumer electronic products is ever changing, which is why the specification of key components (i.e., optical imaging lenses) of the electronic products must also continue to be enhanced, so as to satisfy consumers' demands. The most important features of the optical imaging lenses are imaging quality and volume. The applications of the optical imaging lenses are extensive and are not only limited to image and video shooting but also environmental surveillance, dashboard cameras, VR trackers, facial recognition, and so on. Taking the dashboard cameras as an example, the optical imaging lenses that can detect near-infrared light have been developed due to lack of visible light on the road. Since the applications of the optical imaging lenses are of different types, the types of image sensors associated with the optical imaging lenses are different, but a chief ray angle (CRA) of each image sensor and a chief ray angle of the optical imaging lens must conform to each other, so as to prevent insufficient light collection or white balance and chromatic aberration.

In addition, when electronic devices are used in different environments, differences in the ambient temperatures may cause changes to the back focal length of the optical imaging lens, and imaging quality is thereby affected. Therefore, it is also expected that the variation in the back focal length of the optical imaging lens is less susceptible to temperature changes.

In view of the foregoing problems, the optical imaging lens needs to have not only a good imaging quality but also a low back focal length variation and a small CRA at different ambient temperatures, so as to match with the CRA of the corresponding image sensor. However, a miniaturized optical imaging lens with good imaging quality cannot be produced just by shrinking a lens with good imaging quality. The design process of the optical imaging lens involves the consideration of not only material properties but also production, assembly yield, and other practical problems. Therefore, the technology of the miniaturized optical imaging lens is more complicated than that of a conventional lens. How to produce an optical imaging lens that meets the needs of consumer electronic products and continues to enhance its imaging quality has been the ongoing goal of the industry, the government, and academics.

SUMMARY OF THE INVENTION

The invention provides an optical imaging lens that has an appropriate CRA to match with the CRA of a corresponding image sensor and, at the same time, has a low back focal length variation at different ambient temperatures, so as to achieve good imaging quality.

An embodiment of the invention provides an optical imaging lens including a first lens element, a second lens element, a third lens element, a fourth lens element, a fifth lens element, and a sixth lens element sequentially arranged from an object side to an image side along an optical axis. Each of the first to the sixth lens elements includes an object-side surface facing the object side and allowing imaging rays to pass through and an image-side surface facing the image side and allowing the imaging rays to pass through. The image-side surface of the second lens element has a concave portion in a vicinity of the optical axis. The third lens element has a negative refractive power. The object-side surface of the third lens element has a concave portion in the vicinity of the optical axis. The fourth lens element has a positive refractive power. The object-side surface of the fifth lens element has a convex portion in a vicinity of a periphery. The image-side surface of the sixth lens element has a concave portion in the vicinity of the periphery. Among the lens elements of the optical imaging lens, only the first lens element, the second lens element, the third lens element, the fourth lens element, the fifth lens element, and the sixth lens element have refractive power. The optical imaging lens satisfies $(G12+G34+G45+G56)/G23 \leq 1.500$. Here, G12 is a distance from the image-side surface of the first lens element to the object-side surface of the second lens element along the optical axis. G34 is a distance from the image-side surface of the third lens element to the object-side surface of the fourth lens element along the optical axis. G45 is a distance from the image-side surface of the fourth lens element to the object-side surface of the fifth lens element along the optical axis. G56 is a distance from the image-side surface of the fifth lens element to the object-side surface of the sixth lens element along the optical axis. G23 is a distance from the image-side surface of the second lens element to the object-side surface of the third lens element along the optical axis.

An embodiment of the invention provides an optical imaging lens including a first lens element, a second lens element, a third lens element, a fourth lens element, a fifth lens element, and a sixth lens element sequentially arranged from an object side to an image side along an optical axis. Each of the first to the sixth lens elements includes an object-side surface facing the object side and allowing imaging rays to pass through and an image-side surface facing the image side and allowing the imaging rays to pass through. The image-side surface of the second lens element has a concave portion in a vicinity of the optical axis. The third lens element has a negative refractive power. The object-side surface of the third lens element has a concave portion in the vicinity of the optical axis. The object-side surface of the fourth lens element has a convex portion in the vicinity of the optical axis. The object-side surface of the fifth lens element has a convex portion in a vicinity of a periphery. The image-side surface of the fifth lens element has a concave portion in the vicinity of the periphery. Among the lens elements of the optical imaging lens, only the first lens element, the second lens element, the third lens element, the fourth lens element, the fifth lens element, and the sixth lens element have refractive power. The optical imaging lens satisfies $(G12+G34+G45+G56)/G23 \leq 1.500$. Here, G12 is a distance from the image-side surface of the first lens element to the object-side surface of the second lens element along the optical axis. G34 is a distance from the image-side surface of the third lens element to the object-side surface of the fourth lens element along the optical axis. G45 is a distance from the image-side surface of the fourth lens element to the object-side surface of the fifth lens element along the optical axis. G56 is a distance from the image-side surface of the fifth lens element to the object-side surface of the sixth lens element along the optical axis. G23 is a distance from the image-side surface of the second lens element to the object-side surface of the third lens element along the optical axis.

An embodiment of the invention an optical imaging lens including a first lens element, a second lens element, a third lens element, a fourth lens element, a fifth lens element, and a sixth lens element sequentially arranged from an object side to an image side along an optical axis, wherein each of the first to the sixth lens elements includes an object-side surface facing the object side and allowing imaging rays to pass through and an image-side surface facing the image side and allowing the imaging rays to pass through. The image-side surface of the second lens element has a concave portion in a vicinity of the optical axis. The third lens element has a negative refractive power. The object-side surface of the third lens element has a concave portion in the vicinity of the optical axis, and the image-side surface of the third lens element has a convex portion in the vicinity of the optical axis. The fourth lens element has a positive refractive power, and the object-side surface of the fourth lens element has a convex portion in a vicinity of a periphery. The object-side surface of the fifth lens element has a convex portion in the vicinity of the periphery. The image-side surface of the sixth lens element has a concave portion in the vicinity of the periphery. Among the lens elements of the optical imaging lens, only the first lens element, the second lens element, the third lens element, the fourth lens element, the fifth lens element, and the sixth lens element have refractive power.

Based on the above, the advantageous effects of the optical imaging lens provided in the embodiments of the invention include the following. With the concave/convex shape designs and arrangements of the object-side and the image-side surfaces of the above-mentioned lens elements, the optical imaging lens can have the appropriate CRA to match with the CRA of a corresponding image sensor and, at the same time, can have a low back focal length variation at different ambient temperatures, so as to achieve good imaging quality.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is a schematic view illustrating a surface shape structure of a lens element according to Example 1.

FIG. 4 is a schematic view illustrating a surface shape structure of a lens element according to Example 2.

FIG. 5 is a schematic view illustrating a surface shape structure of a lens element according to Example 3.

FIG. 6 is a schematic view illustrating an optical imaging lens according to a first embodiment of the invention.

FIGS. 7A to 7D are diagrams illustrating a longitudinal spherical aberration and other aberrations of the optical imaging lens according to the first embodiment of the invention.

FIG. 8 shows detailed optical data of the optical imaging lens according to the first embodiment of the invention.

FIG. 9 shows aspheric parameters of the optical imaging lens according to the first embodiment of the invention.

FIG. 10 is a schematic view illustrating an optical imaging lens according to a second embodiment of the invention.

FIGS. 11A to 11D are diagrams illustrating a longitudinal spherical aberration and other aberrations of the optical imaging lens according to the second embodiment of the invention.

FIG. 12 shows detailed optical data of the optical imaging lens according to the second embodiment of the invention.

FIG. 13 shows aspheric parameters of the optical imaging lens according to the second embodiment of the invention.

FIG. 14 is a schematic view illustrating an optical imaging lens according to a third embodiment of the invention.

FIGS. 15A to 15D are diagrams illustrating a longitudinal spherical aberration and other aberrations of the optical imaging lens according to the third embodiment of the invention.

FIG. 16 shows detailed optical data of the optical imaging lens according to the third embodiment of the invention.

FIG. 17 shows aspheric parameters of the optical imaging lens according to the third embodiment of the invention.

FIG. 18 is a schematic view illustrating an optical imaging lens according to a fourth embodiment of the invention.

FIGS. 19A to 19D are diagrams illustrating a longitudinal spherical aberration and other aberrations of the optical imaging lens according to the fourth embodiment of the invention.

FIG. 20 shows detailed optical data of the optical imaging lens according to the fourth embodiment of the invention.

FIG. 21 shows aspheric parameters of the optical imaging lens according to the fourth embodiment of the invention.

FIG. 22 is a schematic view illustrating an optical imaging lens according to a fifth embodiment of the invention.

FIGS. 23A to 23D are diagrams illustrating a longitudinal spherical aberration and other aberrations of the optical imaging lens according to the fifth embodiment of the invention.

FIG. 24 shows detailed optical data of the optical imaging lens according to the fifth embodiment of the invention.

FIG. 25 shows aspheric parameters of the optical imaging lens according to the fifth embodiment of the invention.

FIG. 28 shows detailed optical data of the optical imaging lens according to the sixth embodiment of the invention.

FIG. 29 shows aspheric parameters of the optical imaging lens according to the sixth embodiment of the invention.

FIG. 30 shows important parameters and equations expressing the relations of the parameters of the optical imaging lens according to the first to the sixth embodiments of the invention.

DESCRIPTION OF THE EMBODIMENTS

In the specification, the description of "a lens element having positive refractive power (or negative refractive power)" means that the calculated refractive power of the lens element on the optical axis according to Gaussian optics is positive (or negative). The object-side surface and the image-side surface of a lens element are defined as a range where imaging rays pass through, and the aforementioned imaging rays include a chief ray Lc and a marginal ray Lm. Taking a lens element depicted in FIG. 1 as an example, the lens element is radially symmetric with respect to an optical axis I which is the axis of symmetry. A region A of the lens element where the rays on the optical axis pass through is defined as "a portion in a vicinity of the optical axis", and a region C of the lens element where the marginal ray passes through is defined as "a portion in a vicinity of a periphery of the lens element". Besides, the lens element may also include an extending portion E extended radially and outwardly from the region C for physically assembling the lens element into an optical imaging lens. Under ideal circumstances, the imaging rays do not pass through the extending portion E, while the structures and shapes of the aforementioned extending portion E are only examples and should not be limited. Note that the extending portions of the lens element provided in the following embodiments are partially omitted for clear illustration. The following criteria are provided below for determining the shapes of the surfaces of lens elements, defining the region in the vicinity of the optical axis, defining the region in the vicinity of the periphery of the lens element, or defining plural regions of the lens element.

Figures 1, 2:
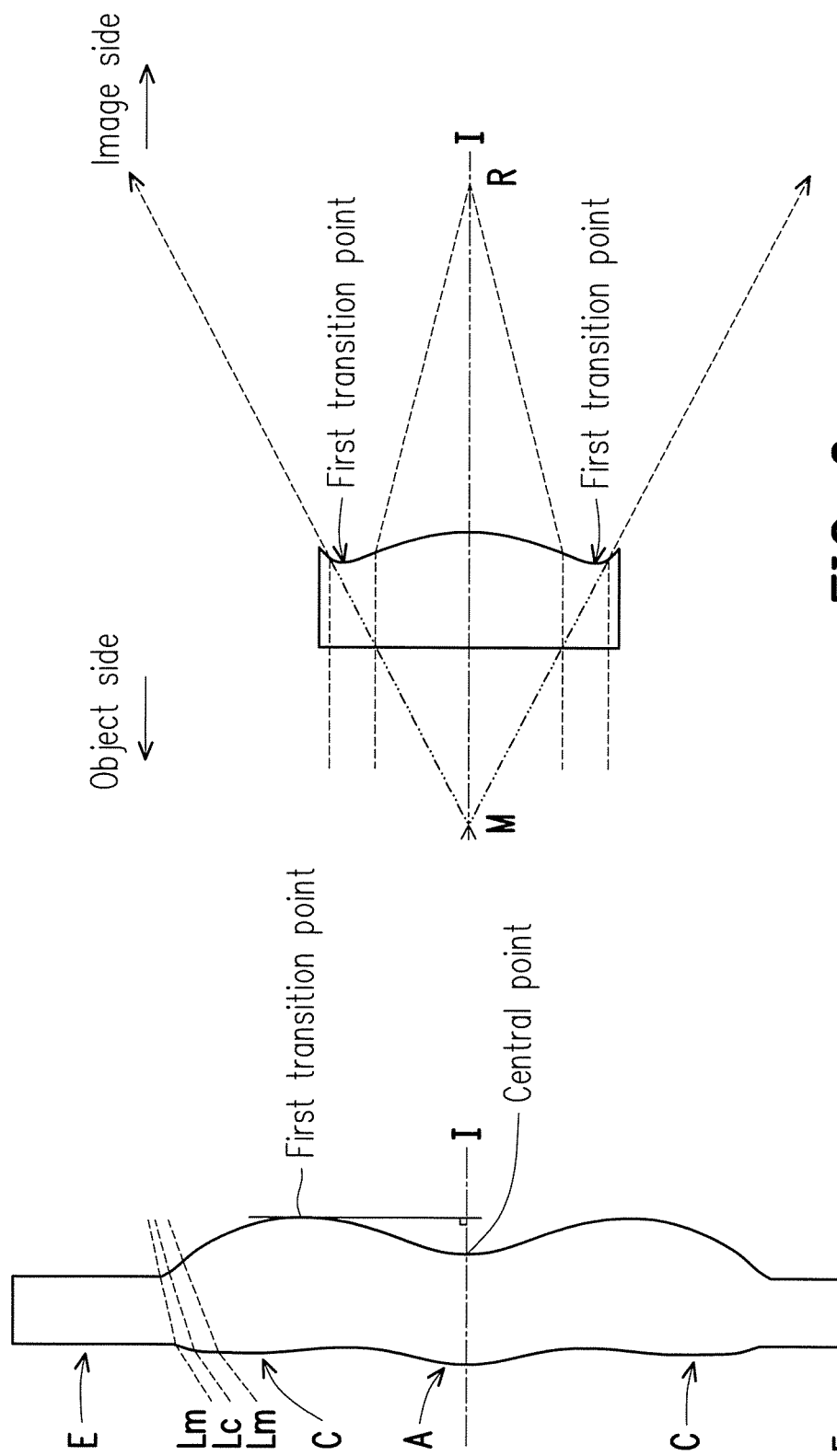
FIG. 1 is a schematic view illustrating a surface shape structure of a lens element.
FIG. 2 is a schematic view illustrating a concave/convex surface shape structure of a lens element and a focus of rays.

FIG. 1 is a cross-sectional view of a lens element in a radial direction. Before determining boundaries of the above-mentioned regions, a central point of a surface of a lens element is defined as a point of intersection of the surface of the lens element and the optical axis, and a transition point is defined as a point on the surface of the lens element. A tangent line passing through the transition point is perpendicular to the optical axis. Additionally, if multiple transition points are arranged outwardly in a radial direction, these transition points are sequentially named along the radial direction with numbers starting from the first transition point. For instance, the first transition point (closest one to the radial direction of the optical axis), the second transition point, and the N-th transition point (farthest one from the radial direction of the optical axis in an effective radius). The region of the lens element between the central point and the first transition point is the portion in the vicinity of the optical axis, and the region extended outwardly from the N-th transition point in the radial direction is the portion in the vicinity of the periphery of the lens element. There are other portions existing between the portion in the vicinity of the optical axis and the portion in the vicinity of the periphery of the lens element; the number of portions depend on the number of the transition point(s). In addition, the effective radius is the vertical distance from the optical axis I to a point of intersection of the marginal ray Lm and the surface of the lens element.

Referring to FIG. 2, the shape of a portion is determined to be convex or concave according to whether the point of intersection of the optical axis and the rays passing through the portion in parallel (or an extension line of the rays) is on the object side or on the image side; that is, the shape of the portion is determined by the focus of rays. For instance, after the rays pass through the portion, if the rays intersect the optical axis at the image side of the lens element, the rays are focused toward the image side, i.e., the focal point of the rays is at the image side, e.g., the point R in FIG. 2; in this case, the portion is determined as having a convex shape. On the contrary, if the rays diverge after passing through a portion, the extension line of the rays intersects the optical axis at the object side of the lens element, i.e., the focus of the rays is at the object side (see the point M in FIG. 2), and the portion is determined as having a concave shape. Therefore, referring to FIG. 2, the portion between the central point and the first transition point has a convex shape, the portion extending outwardly from the first transition point in the radial direction has a concave shape, and the first transition point is the point where the portion having a convex shape is changed to have a concave shape. Hence, the portion and another portion adjacent to the inner side of the portion in the radial direction can be defined to have different surface shapes, and the transition point is where the shape of the portion is changed to another shape of the adjacent portion. Alternatively, there is another common way for a person with ordinary skill in the art to determine whether a portion in the vicinity of the optical axis has a convex or concave shape by referring to an "R" value, which is a paraxial radius of curvature. The R value usually appears in the lens data sheet in the optical software. If the R value is positive, it means that the object-side surface is convex, and a negative R value means that the object-side surface is concave. Conversely, the positive R value means that the image-side surface is concave, and the negative R value means that the image-side surface is convex. The result found by using this method should be consistent with the result determined according to the focus of rays.

If there is no transition point on the surface of the lens element, the portion in the vicinity of the optical axis is defined as the portion between 0-50% of the effective radius of the surface, whereas the portion in the vicinity of the periphery of the lens element is defined as the portion between 50-100% of the effective radius of the surface.

Referring to Example 1 depicted in FIG. 3, the image-side surface of the lens element only has the first transition point on the effective radius. The first portion is in a vicinity of the optical axis, and the second portion is in a vicinity of a periphery of the lens element. The portion in the vicinity of the optical axis is determined as having a concave surface because the R value at the image-side surface of the lens element is positive. The shape of the surface of the portion in the vicinity of the periphery of the lens element is different from that of another portion radially adjoining the portion, i.e., the shape of the surface of the portion in the vicinity of the periphery of the lens element is different from the shape of the portion in the vicinity of the optical axis; the portion in the vicinity of the periphery of the lens element has a convex shape.

Referring to Example 2 depicted in FIG. 4, the object-side surface of the lens element has a first transition point and a second transition point on the effective radius, wherein the first portion is in a vicinity of the optical axis, and the third portion is in a vicinity of a periphery of the lens element. The portion in the vicinity of the optical axis has a convex shape because the R value at the object-side surface of the lens element is positive. A portion existing between the first and second transition points (the second portion) has a concave shape, and the portion in the vicinity of the periphery of the lens element (the third portion) has a convex shape.

Referring to Example 3 depicted in FIG. 5, no transition point exists on the object-side surface of the lens element on the effective radius. In this case, the portion between 0-50% of the effective radius is determined as the portion in the vicinity of the optical axis, and the portion between 50-100% of the effective radius is determined as the portion in the vicinity of the periphery of the lens element. The portion of the object-side surface of the lens element in the vicinity of the optical axis is determined as having a convex shape because the R value in the vicinity of the optical axis is positive, and the portion in the vicinity of the periphery of the lens element is determined as having a convex shape as well because no transition point is between the portion in the vicinity of the optical axis and the portion in the vicinity of the periphery of the lens element.

FIG. 6 is a schematic view illustrating an optical imaging lens according to a first embodiment of the invention. FIGS. 7A to 7D are diagrams illustrating a longitudinal spherical aberration and other aberrations of the optical imaging lens according to the first embodiment of the invention. Referring to FIG. 6, an optical imaging lens 10 in the first embodiment includes a first lens element 1, a second lens element 2, a third lens element 3, an aperture stop 0, a fourth lens element 4, a fifth lens element 5, a sixth lens element 6, and a filter 9 sequentially arranged from an object side to an image side along an optical axis I of the optical imaging lens 10. When a ray emitted from an object to be shot enters the optical imaging lens 10 and passes through the first lens element 1, the second lens element 2, the third lens element 3, the aperture stop 0, the fourth lens element 4, the fifth lens element 5, the sixth lens element 6, and the filter 9, an image is formed on an image plane 100. It should be mentioned that the object side faces the object to be shot, and the image side faces the image plane 100.

The first lens element 1, the second lens element 2, the third lens element 3, the fourth lens element 4, the fifth lens element 5, the sixth lens element 6, and the filter 9 each has an object-side surface 11, 21, 31, 41, 51, 61, and 91 facing the object side 62, and 92 facing the image side and allowing the imaging rays to pass through.

In the present embodiment, materials of the first lens element 1, the second lens element 2, the third lens element 3, the fourth lens element 4, the fifth lens element 5, and the sixth lens element 6 are plastic, plastic, plastic, glass, plastic, and plastic, respectively, but the invention is not limited hereto.

The first lens element 1 has negative refractive power. The object-side surface 11 of the first lens element 1 has a concave portion 111 in the vicinity of the optical axis I and a convex portion 112 in the vicinity of the periphery. The image-side surface 12 of the first lens element 1 has a concave portion 121 in the vicinity of the optical axis I and a concave portion 122 in the vicinity of the periphery. In the present embodiment, the object-side surface 11 and the image-side surface 12 of the first lens element 1 are both aspheric surfaces.

The second lens element 2 has positive refractive power. The object-side surface 21 of the second lens element 2 has a convex portion 211 in the vicinity of the optical axis I and a convex portion 212 in the vicinity of the periphery. The image-side surface 22 of the second lens element 2 has a concave portion 221 in the vicinity of the optical axis I and a concave portion 222 in the vicinity of the periphery. In the present embodiment, the object-side surface 21 and the image-side surface 22 of the second lens element 2 are both aspheric surfaces.

The third lens element 3 has negative refractive power. The object-side surface 31 of the third lens element 3 has a concave portion 311 in the vicinity of the optical axis I and a concave portion 312 in the vicinity of the periphery. The image-side surface 32 of the third lens element 3 has a convex portion 321 in the vicinity of the optical axis I and a convex portion 322 in the vicinity of the periphery. In the present embodiment, the object-side surface 31 and the image-side surface 32 of the third lens element 3 are both aspheric surfaces.

The fourth lens element 4 has positive refractive power. The object-side surface 41 of the fourth lens element 4 has a convex portion 411 in the vicinity of the optical axis I and a convex portion 412 in the vicinity of the periphery. The image-side surface 42 of the fourth lens element 4 has a concave portion 421 in the vicinity of the optical axis I and a concave portion 422 in the vicinity of the periphery. In the present embodiment, the object-side surface 41 and the image-side surface 42 of the fourth lens element 4 are both aspheric surfaces.

The fifth lens element 5 has positive refractive power. The object-side surface 51 of the fifth lens element 5 has a convex portion 511 in the vicinity of the optical axis I and a convex portion 512 in the vicinity of the periphery. The image-side surface 52 of the fifth lens element 5 has a convex portion 521 in the vicinity of the optical axis I and a concave portion 522 in the vicinity of the periphery. In the present embodiment, the object-side surface 51 and the image-side surface 52 of the fifth lens element 5 are both aspheric surfaces.

The sixth lens element 6 has positive refractive power. The object-side surface 61 of the sixth lens element 6 has a concave portion 611 in the vicinity of the optical axis I and a convex portion 612 in the vicinity of the periphery. The image-side surface 62 of the sixth lens element 6 has a convex portion 621 in the vicinity of the optical axis I and a concave portion 622 in the vicinity of the periphery. In the present embodiment, the object-side surface 61 and the image-side surface 62 of the sixth lens element 6 are both aspheric surfaces.

In the present embodiment, among the lens elements of the optical imaging lens 10, only the first lens element 1, the second lens element 2, the third lens element 3, the fourth lens element 4, the fifth lens element 5, and the sixth lens element 6 have refractive power; only six lens elements have refractive power.

The optical imaging lens 10 provided in the first embodiment has favorable thermal stability. To be more specific, the optical imaging lens 10 has a very small back focal length variation at different ambient temperatures. For example, a room temperature of 20° C. is set as a reference temperature, and a back focal length variation of the optical imaging lens 10 at the room temperature of 20° C. is 0.000 mm; a back focal length variation of the optical imaging lens 10 at a room temperature of −20° C. is −0.022 mm; a back focal length variation of the optical imaging lens 10 at a room temperature of 80° C. is 0.033 mm.

The optical imaging lens 10 provided in the first embodiment has a small chief ray angle (CRA) to match the CRA of the corresponding image sensor. For example, the CRA of the optical imaging lens 10 provided in the first embodiment is 16.08°.

The detailed optical data in the first embodiment are described in FIG. 8. In the first embodiment, an overall effective focal length (EFL) is 5.780 mm, the half field of view (HFOV) is 25.765°, the f-number (Fno) is 2.5, the system length is 18.487 mm, and the image height is 3.000 mm. Here, the system length refers to a distance from the object-side surface 11 of the first lens element 1 to the image plane 100 along the optical axis I.

In addition, in the present embodiment, the total of twelve surfaces, namely the object-side surfaces 11, 21, 31, 41, 51, and 61 and the image-side surfaces 12, 22, 32, 42, 52, and 62 of the first lens element 1, the second lens element 2, the third lens element 3, the fourth lens element 4, the fifth lens element 5, and the sixth lens element 6 are aspheric surfaces. The aspheric surfaces are defined by the following formula:

$$Z(Y) = \frac{Y^2}{R} \bigg/ \left(1 + \sqrt{1-(1+K)\frac{Y^2}{R^2}}\right) + \sum_{i=1}^{n} a_i \times Y^i \quad (1)$$

wherein

Y is a distance from a point on an aspheric curve to the optical axis I;

Z is a depth of the aspheric surface (i.e., a perpendicular distance from the point that is located on the aspheric surface and spaced from the optical axis I by the distance Y to a tangent plane tangent to a vertex of the aspheric surface on the optical axis I);

R is a radius of curvature of the surface of the lens element near the optical axis I;

K is a conic constant;

$a_i$ is the i-th aspheric coefficient.

FIG. 9 shows the aspheric coefficients of the object-side surface 11 of the first lens element 1 to the image-side surface 62 of the sixth lens element 6 in the formula (1). Here, the field number 11 in FIG. 9 represents the aspheric coefficient of the object-side surface 11 of the first lens element 1, and the rest may be deduced in the similar manner.

In addition, the relation among the important parameters of the optical imaging lens 10 in the first embodiment is as shown in FIG. 30, wherein T1 represents a thickness of the first lens element 1 along the optical axis I;

T2 represents a thickness of the second lens element 2 along the optical axis

T3 represents a thickness of the third lens element 3 along the optical axis I;

T4 represents a thickness of the fourth lens element 4 along the optical axis I;

T5 represents a thickness of the fifth lens element 5 along the optical axis I;

T6 represents a thickness of the sixth lens element 6 along the optical axis I;

TF represents a thickness of the filter 9 along the optical axis I;

G12 represents a distance from the image-side surface 12 of the first lens element 1 to the object-side surface 21 of the second lens element 2 along the optical axis I;

G23 represents a distance from the image-side surface 22 of the second lens element 2 to the object-side surface 31 of the third lens element 3 along the optical axis I;

G34 represents a distance from the image-side surface 32 of the third lens element 3 to the object-side surface 41 of the fourth lens element 4 along the optical axis I;

G45 represents a distance from the image-side surface 42 of the fourth lens element 4 to the object-side surface 51 of the fifth lens element 5 along the optical axis I;

G56 represents a distance from the image-side surface 52 of the fifth lens element 5 to the object-side surface 61 of the sixth lens element 6 along the optical axis I;

G6F represents a distance from the image-side surface 62 of the sixth lens element 6 to the object-side surface 91 of the filter 9 along the optical axis I;

GFP represents a distance from the image-side surface 92 of the filter 9 to the image plane 100 along the optical axis I, AAG represents a sum of five air gaps among the first lens element 1 to the sixth lens element 6 along the optical axis I, i.e., the sum of G12, G23, G34, G45, and G56;

ALT represents a sum of the thicknesses of the first lens element 1, the second lens element 2, the third lens element 3, the fourth lens element 4, the fifth lens element 5, and the sixth lens element 6 along the optical axis I, i.e., the sum of T1, T2, T3, T4, T5, and T6;

TTL represents a distance from the object-side surface 11 of the first lens element 1 to the image plane 100 along the optical axis I;

TL represents a distance from the object-side surface 11 of the first lens element 1 to the image-side surface 62 of the sixth lens element 6 along the optical axis I;

BFL represents a distance from the image-side surface 62 of the sixth lens element 6 to the image plane 100 along the optical axis I;

EFL represents an effective focal length of the optical imaging lens 10.

In addition, it is further defined that:

GFP represents an air gap between the filter 9 and the image plane 100 along the optical axis I;

f1 is a focal length of the first lens element 1;

f2 is a focal length of the second lens element 2;

f3 is a focal length of the third lens element 3;

f4 is a focal length of the fourth lens element 4;

f5 is a focal length of the fifth lens element 5;

f6 is a focal length of the sixth lens element 6;

n1 is a refractive index of the first lens element 1;

n2 is a refractive index of the second lens element 2;

n3 is a refractive index of the third lens element 3;

n4 is a refractive index of the fourth lens element 4;

n5 is a refractive index of the fifth lens element 5;

n6 is a refractive index of the sixth lens element 6;

v1 is an Abbe number of the first lens element 1 (the Abbe number may also be referred to as a coefficient of dispersion);

v2 is an Abbe number of the second lens element 2;

v3 is an Abbe number of the third lens element 3;

v4 is an Abbe number of the fourth lens element 4;

v5 is an Abbe number of the fifth lens element 5;

v6 is an Abbe number of the fifth lens element 6.

In FIG. 30, the numeric values of T1 to EFL are in the unit of millimeters (mm).

Please refer to FIGS. 7A to 7D. FIG. 7A illustrates the longitudinal spherical aberration according to the first embodiment. FIGS. 7B and 7C are diagrams respectively illustrating an astigmatism aberration in a sagittal direction on the image plane 100 and an astigmatism aberration in a tangential direction on the image plane 100 in the first embodiment. FIG. 7D is a diagram illustrating a distortion aberration on the image plane 100 in the first embodiment. In FIG. 7A that illustrates the longitudinal spherical aberration according to the first embodiment, the curve representing each wavelength is close to one another and near the central position, which shows that the off-axis ray of each wavelength at different heights is focused near the imaging point. The deviation range of the curve representing each wavelength shows that the deviation of the imaging point of the off-axis ray at different heights is controlled to be within a range of ±0.025 mm. Accordingly, it is evident that the issue of spherical aberration at the same wavelength is resolved to a great extent according to the present embodiment. In addition, the curves representing the three representative wavelengths are close to one another, which represents that the imaging positions of the rays with different wavelengths are concentrated; therefore, the chromatic aberration can be significantly improved.

In FIGS. 7B and 7C which are two diagrams of astigmatism aberration, the focal length variation in the three representative wavelengths in the entire field of view falls within ±0.08 mm, which represents that the optical system in the first embodiment can effectively eliminate aberration. In FIG. 7D, the diagram of distortion aberration shows that the distortion aberration in the first embodiment can be maintained within ±8.0%, which shows that the distortion aberration in the first embodiment can meet the image quality requirement of the optical system. Based on the above, it is shown that better image quality can be ensured according to the first embodiment as compared to the image quality of the existing optical lens, given that the system length of the optical lens is shortened to about 18.487 mm.

FIG. 10 is a schematic view illustrating an optical imaging lens according to a second embodiment of the invention. FIGS. 11A to 11D are diagrams illustrating a longitudinal spherical aberration and other aberrations of the optical imaging lens according to the second embodiment of the invention. Referring to FIG. 10, the optical imaging lens 10 provided in the second embodiment of the invention is similar to that provided in the first embodiment, while the optical data, the aspheric coefficients, and the parameters of the lens elements 1, 2, 3, 4, 5, and 6 are slightly different in these two embodiment, and the object-side surface 11 of the first lens element 1 has a convex portion 113 in the vicinity of the optical axis I. It should be noted that, in order to show the drawings clearly, some numerals which are the same as those used to indicate the concave portion and the convex portion in the first embodiment are omitted from FIG. 10.

The optical imaging lens 10 provided in the second embodiment has favorable thermal stability. To be more specific, the optical imaging lens 10 has a very small back focal length variation at different ambient temperatures. For example, a room temperature of 20° C. is set as a reference temperature, and a back focal length variation of the optical imaging lens 10 at the room temperature of 20° C. is 0.000 mm; a back focal length variation of the optical imaging lens 10 at a room temperature of −20° C. is −0.031 mm; a back focal length variation of the optical imaging lens 10 at a room temperature of 80° C. is 0.021 mm.

The optical imaging lens 10 provided in the second embodiment has a small CRA to match with the CRA of the corresponding image sensor. For example, the CRA of the optical imaging lens 10 provided in the second embodiment is 15.30°.

The detailed optical data of the optical imaging lens 10 are as shown in FIG. 12. In the second embodiment, the overall EFL is 5.415 mm, the HFOV is 25.025°, the Fno is 3.5, the system length is 19.609 mm, and the image height is 3.000 mm.

FIG. 13 shows the aspheric coefficients of the object-side surface 11 of the first lens element 1 through the image-side surface 62 of the sixth lens element 6 in the formula (1) according to the second embodiment.

In addition, the relation among the important parameters of the optical imaging lens 10 in the second embodiment is as shown in FIG. 30.

In FIG. 11A that illustrates the longitudinal spherical aberration in the second embodiment, the imaging point deviation of the off-axis ray at different heights is controlled to be within +0.02 mm. In FIGS. 11B and 11C which illustrate two diagrams of astigmatism aberration, the focal length variation in the three representative wavelengths in the entire field of view falls within ±0.10 mm. In FIG. 11D, the diagram of distortion aberration shows that the distortion aberration in the second embodiment can be maintained within ±20%. It is shown that, compared to the existing optical lens, the optical imaging lens in the second embodiment can still provide better imaging quality even when the system length has been shortened to about 19.609 mm.

Based on the above, it can be learn that the second embodiment is superior to the first embodiment because the longitudinal spherical aberration in the second embodiment is smaller than the longitudinal spherical aberration in the first embodiment, and the optical imaging lens provided in the second embodiment is easier to be manufactured than that provided in the first embodiment; therefore, a higher yield rate can be achieved.

FIG. 14 is a schematic view illustrating an optical imaging lens according to a third embodiment of the invention. FIGS. 15A to 15D are diagrams illustrating a longitudinal spherical aberration and other aberrations of the optical imaging lens according to the third embodiment of the invention. Referring to FIG. 14, the optical imaging lens 10 provided in the third embodiment of the invention is similar to that provided in the first embodiment, while the optical data, the aspheric coefficients, and the parameters of the lens elements 1, 2, 3, 4, 5, and 6 are slightly different in these two embodiment, and the object-side surface 11 of the first lens element 1 has a concave portion 114 in the vicinity of the periphery. It should be noted that, in order to show the drawings clearly, some numerals which are the same as those used to indicate the concave portion and the convex portion in the first embodiment are omitted from FIG. 14.

The optical imaging lens 10 provided in the third embodiment has favorable thermal stability. To be more specific, the optical imaging lens 10 has a very small back focal length variation at different ambient temperatures. For example, a room temperature of 20° C. is set as a reference temperature, and a back focal length variation of the optical imaging lens 10 at the room temperature of 20° C. is 0.000 mm; a back focal length variation of the optical imaging lens 10 at a room temperature of −20° C. is −0.042 mm; a back focal length variation of the optical imaging lens 10 at a room temperature of 80° C. is 0.053 mm.

The optical imaging lens 10 provided in the third embodiment has a small CRA to match with the CRA of the corresponding image sensor. For example, the CRA of the optical imaging lens 10 provided in the third embodiment is 9.56°.

The detailed optical data of the optical imaging lens 10 are as shown in FIG. 16. In the third embodiment, the overall EFL is 3.105 mm, the HFOV is 55.052°, the Fno is 3.5, the system length is 23.657 mm, and the image height is 3.000 mm.

FIG. 17 shows the aspheric coefficients of the object-side surface 11 of the first lens element 1 through the image-side surface 62 of the sixth lens element 6 in the formula (1) according to the third embodiment.

In addition, the relation among the important parameters of the optical imaging lens 10 in the third embodiment is as shown in FIG. 30.

In FIG. 15A that illustrates the longitudinal spherical aberration in the third embodiment, the imaging point deviation of the off-axis ray at different heights is controlled to be within ±0.02 mm. In FIGS. 15B and 15C which illustrate two diagrams of astigmatism aberration, the focal length variation in the three representative wavelengths in the entire field of view falls within ±0.08 mm. In FIG. 15D, the diagram of distortion aberration shows that the distortion aberration in the third embodiment can be maintained within ±50%. It is shown that, compared to the existing optical lens, the optical imaging lens in the third embodiment can still provide better imaging quality even when the system length has been shortened to about 23.657 mm.

Based on the above, it can be learned that the third embodiment is superior to the first embodiment because the HFOV provided in the third embodiment is larger than the HFOV provided in the first embodiment, the longitudinal spherical aberration provided in the third embodiment is smaller than the longitudinal spherical aberration provided in the first embodiment, and the optical imaging lens provided in the third embodiment is easier to be manufactured than that provided in the first embodiment; therefore, a higher yield rate can be achieved.

FIG. 18 is a schematic view illustrating an optical imaging lens according to a fourth embodiment of the invention. FIGS. 19A to 19D are diagrams illustrating a longitudinal spherical aberration and other aberrations of the optical imaging lens according to the fourth embodiment of the invention. Referring to FIG. 18, the optical imaging lens 10 provided in the fourth embodiment of the invention is similar to that provided in the first embodiment, while the optical data, the aspheric coefficients, and the parameters of the lens elements 1, 2, 3, 4, 5, and 6 are slightly different in these two embodiment, the object-side surface 11 of the first lens element 1 has a convex portion 113 in the vicinity of the optical axis I, and the image-side surface 52 of the fifth lens element 5 has a concave portion 523 in the vicinity of the optical axis I. It should be noted that, in order to show the drawings clearly, some numerals which are the same as those used to indicate the concave portion and the convex portion in the first embodiment are omitted from FIG. 18.

The optical imaging lens 10 provided in the fourth embodiment has favorable thermal stability. To be more specific, the optical imaging lens 10 has a very small back focal length variation at different ambient temperatures. For example, a room temperature of 20° C. is set as a reference temperature, and a back focal length variation of the optical imaging lens 10 at the room temperature of 20° C. is 0.000 mm; a back focal length variation of the optical imaging lens 10 at a room temperature of −20° C. is 0.006 mm; a back focal length variation of the optical imaging lens 10 at a room temperature of 80° C. is −0.007 mm.

The optical imaging lens 10 provided in the fourth embodiment has a small CRA to match with the CRA of the corresponding image sensor. For example, the CRA of the optical imaging lens 10 provided in the fourth embodiment is 25.97°.

The detailed optical data of the optical imaging lens 10 are as shown in FIG. 20. In the fourth embodiment, the overall EFL is 5.736 mm, the HFOV is 24.587°, the Fno is 2.5, the system length is 14.985 mm, and the image height is 3.000 mm.

FIG. 21 shows the aspheric coefficients of the object-side surface 11 of the first lens element 1 through the image-side surface 62 of the sixth lens element 6 in the formula (1) according to the fourth embodiment.

In addition, the relation among the important parameters of the optical imaging lens 10 in the fourth embodiment is as shown in FIG. 30.

In FIG. 19A that illustrates the longitudinal spherical aberration in the fourth embodiment, the imaging point deviation of the off-axis ray at different heights is controlled to be within +0.02 mm. In FIGS. 19B and 19C which illustrate two diagrams of astigmatism aberrations, the focal length variation in the three representative wavelengths in the entire field of view falls within +0.050 mm. In FIG. 19D, the diagram of distortion aberration shows that the distortion aberration in the fourth embodiment can be maintained within ±20%. It is shown that, compared to the existing optical lens, the optical imaging lens in the fourth embodiment can still provide better imaging quality even when the system length has been shortened to about 14.985 mm.

Based on the above, it can be learned that the fourth embodiment is superior to the first embodiment because the system length provided in the fourth embodiment is shorter than the system length provided in the first embodiment, the longitudinal spherical aberration provided in the fourth embodiment is smaller than the longitudinal spherical aberration provided in the first embodiment, and the optical imaging lens provided in the fourth embodiment is easier to be manufactured than that provided in the first embodiment; therefore, a higher yield rate can be achieved.

FIG. 22 is a schematic view illustrating an optical imaging lens according to a fifth embodiment of the invention. FIGS. 23A to 23D are diagrams illustrating a longitudinal spherical aberration and other aberrations of the optical imaging lens according to the fifth embodiment of the invention. Referring to FIG. 22, the optical imaging lens 10 provided in the fifth embodiment of the invention is similar to that provided in the first embodiment, while the optical data, the aspheric coefficients, and the parameters of the lens elements 1, 2, 3, 4, 5, and 6 are slightly different in these two embodiment, the object-side surface 11 of the first lens element 1 has a convex portion 113 in the vicinity of the optical axis I, and the sixth lens element 6 has negative refractive power. It should be noted that, in order to show the drawings clearly, some numerals which are the same as those used to indicate the concave portion and convex portion in the first embodiment are omitted from FIG. 22.

The optical imaging lens 10 provided in the fifth embodiment has favorable thermal stability. To be more specific, the optical imaging lens 10 has a very small back focal length variation at different ambient temperatures. For example, a room temperature of 20° C. is set as a reference temperature, and a back focal length variation of the optical imaging lens 10 at the room temperature of 20° C. is 0.000 mm; a back focal length variation of the optical imaging lens 10 at a room temperature of −20° C. is −0.038 mm; a back focal length variation of the optical imaging lens 10 at a room temperature of 80° C. is 0.051 mm.

The optical imaging lens 10 provided in the fifth embodiment has a small CRA to match with the CRA of the corresponding image sensor. For example, the CRA of the optical imaging lens 10 provided in the fifth embodiment is 12.79°.

The detailed optical data of the optical imaging lens 10 are as shown in FIG. 24. In the fifth embodiment, the overall EFL is 15.762 mm, the HFOV is 10.363°, the Fno is 2.5, the system length is 23.644 mm, and the image height is 3.000 mm.

FIG. 25 shows the aspheric coefficients of the object-side surface 11 of the first lens element 1 through the image-side surface 62 of the sixth lens element 6 in the formula (1) according to the fifth embodiment.

In addition, the relation among the important parameters of the optical imaging lens 10 in the fifth embodiment is as shown in FIG. 30.

In FIG. 23A that illustrates the longitudinal spherical aberration in the fifth embodiment, the imaging point deviation of the off-axis ray at different heights is controlled to be within ±0.025 mm. In FIGS. 23B and 23C which illustrate two diagrams of astigmatism aberrations, the focal length variation in the three representative wavelengths in the entire field of view falls within ±0.08 mm. In FIG. 23D, the diagram of distortion aberration shows that the distortion aberration in the fifth embodiment can be maintained within ±5%. It is shown that, compared to the existing optical lens, the optical imaging lens in the fifth embodiment can still provide better imaging quality even when the system length has been shortened to about 23.644 mm.

Based on the above, it can be learned that the fifth embodiment is superior to the first embodiment because the image distortion aberration provided in the fifth embodiment is smaller than the image distortion aberration provided in the first embodiment, and the optical imaging lens provided in the fifth embodiment is easier to be manufactured than that provided in the first embodiment; therefore, a higher yield rate can be achieved.

Figure 26:
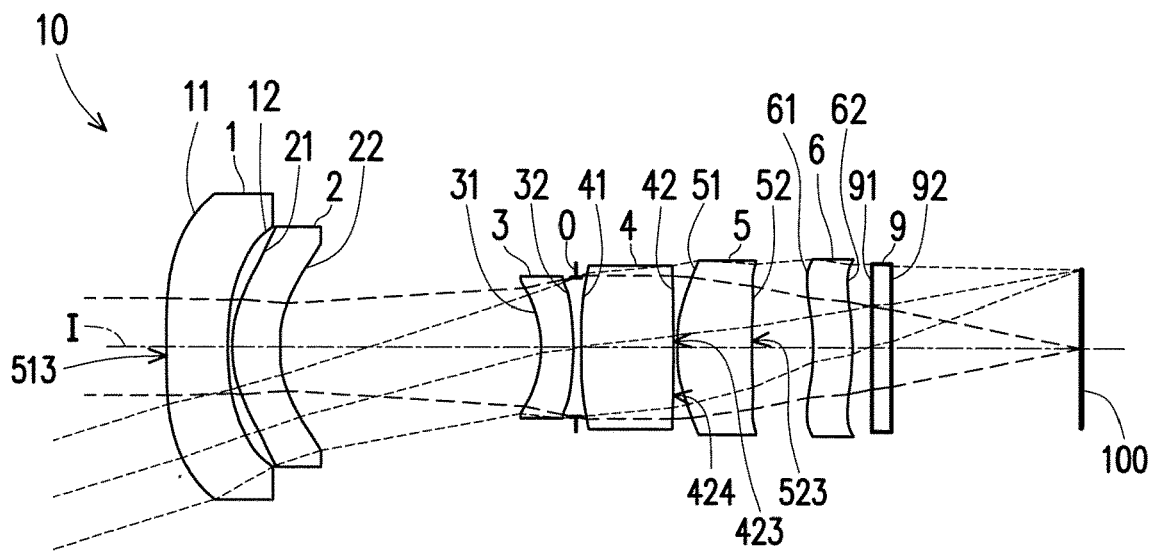
FIG. 26 is a schematic view illustrating an optical imaging lens according to a sixth embodiment of the invention.

FIG. 26 is a schematic view illustrating an optical imaging lens according to a sixth embodiment of the invention. FIGS. 27A to 27D are diagrams illustrating a longitudinal spherical aberration and other aberrations of the optical imaging lens according to the sixth embodiment of the invention. Referring to FIG. 26, the optical imaging lens 10 provided in the sixth embodiment of the invention is similar to that provided in the first embodiment, while the optical data, the aspheric coefficients, and the parameters of the lens elements 1, 2, 3, 4, 5, and 6 are slightly different in these two embodiment, the object-side surface 11 of the first lens element 1 has a convex portion 113 in the vicinity of the optical axis I, the image-side surface 42 of the fourth lens element 4 has a convex portion 423 in the vicinity of the optical axis I and a convex portion 424 in the vicinity of the periphery, the image-side surface 52 of the fifth lens element 5 has a concave portion 523 in the vicinity of the optical axis I, and the sixth lens element 6 has negative refractive power. It should be noted that, in order to show the drawings clearly, some numerals which are the same as those used to indicate the concave portion and the convex portion in the first embodiment are omitted from FIG. 26.

The optical imaging lens 10 provided in the sixth embodiment has favorable thermal stability. To be more specific, the optical imaging lens 10 has a very small back focal length variation at different ambient temperatures. For example, a room temperature of 20° C. is set as a reference temperature, and a back focal length variation of the optical imaging lens 10 at the room temperature of 20° C. is 0.000 mm; a back focal length variation of the optical imaging lens 10 at a room temperature of −20° C. is −0.012 mm, while a back focal length variation of the optical imaging lens 10 at a room temperature of 80° C. is 0.018 mm.

The optical imaging lens 10 provided in the sixth embodiment has a small CRA to match with the CRA of the corresponding image sensor. For example, the CRA of the optical imaging lens 10 provided in the sixth embodiment is 10.21°.

The detailed optical data of the optical imaging lens 10 are as shown in FIG. 28. In the sixth embodiment, the overall EFL is 9.414 mm, the HFOV is 17.253°, the Fno is 2.5, the system length is 34.914 mm, and the image height is 3.000 mm.

FIG. 29 shows the aspheric coefficients of the object-side surface 11 of the first lens element 1 through the image-side surface 62 of the sixth lens element 6 in the formula (1) according to the sixth embodiment.

In addition, the relation among the important parameters of the optical imaging lens 10 in the sixth embodiment is as shown in FIG. 30.

Figures 27A, 27B, 27C, 27D:
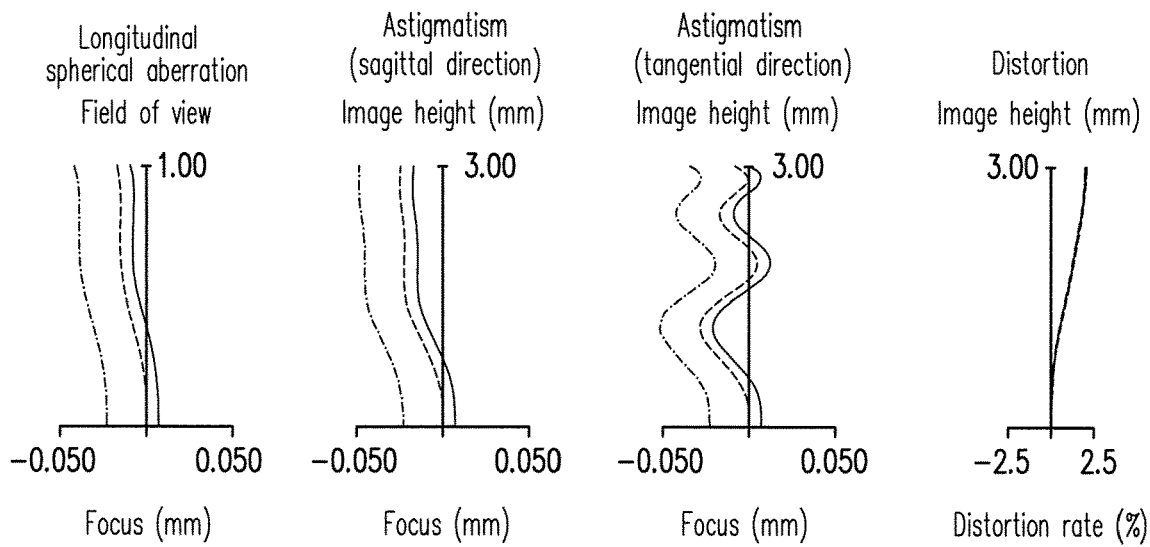
FIGS. 27A to 27D are diagrams illustrating a longitudinal spherical aberration and other aberrations of the optical imaging lens according to the sixth embodiment of the invention.

In FIG. 27A that illustrates the longitudinal spherical aberration in the sixth embodiment, the imaging point deviation of the off-axis ray at different heights is controlled to be within ±0.50 mm. In FIGS. 27B and 27C which illustrate two diagrams of astigmatism aberrations, the focal length variation in the three representative wavelengths in the entire field of view falls within +0.05 mm. In FIG. 27D, the diagram of distortion aberration shows that the distortion aberration in the sixth embodiment can be maintained within ±2.5%. It is shown that, compared to the existing optical lens, the optical imaging lens in the sixth embodiment can still provide better imaging quality even when the system length has been shortened to about 34.914 mm.

Based on the above, it can be learned that the sixth embodiment is superior to the first embodiment because the astigmatism aberration provided in the sixth embodiment is smaller than the astigmatism aberration provided in the first embodiment, the image distortion aberration provided in the sixth embodiment is smaller than the image distortion aberration provided in the first embodiment, and the optical imaging lens provided in the sixth embodiment is easier to be manufactured than that provided in the first embodiment; therefore, a higher yield rate can be achieved.

Please refer to FIG. 30, which is a table that lists the optical parameters provided in the six embodiments described above. When the relation among the optical parameters of the optical imaging lens 10 provided in the embodiments of the invention satisfies at least one of the following conditions, the designer can be assisted to design an optical imaging lens that has good optical performance and is technically feasible:

1. In order to shorten the length of the lens system, the thicknesses of the lens elements and the air gaps among the lens elements are appropriately shortened in the embodiments of the invention; however, in consideration of the difficulty of the assembly process of the lens elements and the need to ensure image quality, the thicknesses of the lens elements and the air gaps among the lens elements should both be taken into account, or the proportion of specific optical parameters in the combination of numeral values of a lens group need to be adjusted. As such, given that the numeral limitations in the following conditional expressions are satisfied, the optical imaging system may have favorable configurations:

$(G12+G34+G45+G56)/G23 \le 1.500$, preferably $0.200 \le (G12+G34+G45+G56)/G23 \le 1.500$;

$ALT/T4 \le 5.300$, preferably $2.500 \le ALT/T4 \le 5.300$;

$(T1+G12+T2)/T6 \le 3.000$, preferably $0.800 \le (T1+G12+T2)/T6 \le 3.000$;

$ALT/BFL \le 2.800$, preferably $0.600 \le ALT/BFL \le 2.800$;

$AAG/G23 \le 3.000$, preferably $0.900 \le AAG/G23 \le 3.000$;

$(T4+G45+T5+G56+T6)/AAG \le 2.000$, preferably $0.800 \le (T4+G45+T5+G56+T6)/AAG \le 2.000$;

$(T4+G45+T5)/T2 \le 4.500$, preferably $1.9005 \le (T4+G45+T5)/T2 \le 54.500$;

$(T4+G45+T5)/T5 \le 2.700$, preferably $1.5005 \le (T4+G45+T5)/T5 \le 52.700$;

$(T4+G45+T5+G56+T6)/(T1+G12+T2) \le 2.400$, preferably $1.100 \le (T4+G45+T5+G56+T6)/(T1+G12+T2) \le 2.400$;

$(T1+G12+T2+G23+T3)/BFL \leq 2.100$, preferably
$0.500 \leq (T1+G12+T2+G23+T3)/BFL \leq 2.100$;

$(T3+G34+T4+G45+T5)/T2 \leq 4.500$, preferably $2.600 \leq (T3+G34+T4+G45+T5)/T2 \leq 4.500$;

$(T3+G34+T4+G45+T5)/G23 \leq 3.900$, preferably
$0.8005 \leq (T3+G34+T4+G45+T5)/G23 \leq 3.900$; and $(T3+G34+T4+G45+T5)/T5 \leq 3.100$, preferably $1.700 \leq (T3+G34+T4+G45+T5)/T5 \leq 3.100$.

2. The ratio of the optical element parameters to the length of the optical imaging lens is maintained to be within an appropriate range, so as to prevent the optical element parameters from becoming too small, which is detrimental to the production of the optical imaging lens, or to prevent the optical element parameters from becoming too large, which may lead to the excessive length of the optical imaging lens:

$TTL/G23 \leq 13.300$, preferably $2.300 \leq TTL/G23 \leq 13.300$;

$TL/(T1+G12+T2+G23+T3) \leq 2.600$, preferably
$1.600 \leq TL/(T1+G12+T2+G23+T3) \leq 2.600$;

$TTL/EFL \leq 8.500$, preferably $0.600 \leq TTL/EFL \leq 8.500$;

$TTL/AAG \leq 5.400$, preferably $2.100 \leq TTL/AAG \leq 5.400$;

$TL/BFL \leq 4.500$, preferably $1.100 \leq TL/BFL \leq 4.500$.

One, more, or all of following conditions may be satisfied to effectively reduce the CRA, so as to match with the corresponding CRA of the image sensor. Simultaneously, a small back focal length variation at different ambient temperatures can be achieved, and good imaging quality can be ensured.

1. The image-side surface of the second lens element has a concave portion in the vicinity of the optical axis, so as to help collect imaging rays.

2. The object-side surface of the third lens element has a concave portion in the vicinity of the optical axis, so as to help correct the spherical aberration produced by the first lens element and the second lens element.

3. The object-side surface of the fifth lens element has a convex portion in the vicinity of the optical axis, so as to help correct the astigmatism produced by the first lens element to the fourth lens element.

4. If, alternatively, the third lens element has the negative refractive power, or the image-side surface of the third lens element has a convex portion in the vicinity of the optical axis, the overall aberration can be corrected.

5. If, alternatively, the fourth lens element has the positive refractive power, the object-side surface of the fourth lens element has a convex portion in the vicinity of the optical axis, or the object-side surface of the fourth lens element has a convex portion in the vicinity of the periphery, the imaging rays can be concentrated.

6. If, alternatively, the image-side surface of the fifth lens element has a concave portion in the vicinity of the periphery, or the image-side surface of the sixth lens element has a concave portion in the vicinity of the periphery, the CRA can be reduced.

However, in view of the unpredictability of the design of the optical system, according to the embodiments of invention, the length of the lens may be shortened, the available aperture may be increased, the field of view may be expanded, the image quality may be improved, or better yield rate can be achieved to improve the prior art, given that the above-described conditions are satisfied.

To sum up, the optical imaging lens 10 provided in the embodiment of the invention can achieve the following effects and advantages:

1. The longitudinal spherical aberrations, the astigmatism aberrations, and the distortion aberrations provided in the embodiments of the invention all comply with the usage specifications. In addition, the off-axis rays of the three representative wavelengths of 930 nm, 960 nm, and 970 nm at different heights are focused near the imaging point, and the derivation range of each curve representing each wavelength shows that the imaging point deviation of the off-axis rays at different heights is well controlled, so as to sufficiently suppress spherical aberrations, astigmatism aberrations, and distortion aberrations. Referring to the imaging quality data, the distance among the three representative wavelengths of 930 nm, 960 nm, and 970 nm is fairly close, which represents that the optical imaging lens of the embodiments of the invention is characterized by good concentration of rays at different wavelengths under different circumstances and good capability of suppressing color dispersions. Based on the above, it can be known that the optical imaging lens provided in the invention has good optical performance, and the optical imaging lens 10 provided in the embodiments of the invention can be used as a night vision lens for infrared light imaging or a pupil recognition lens, and it is known from the above descriptions that the optical imaging lens 10 has good infrared light imaging effects.

2. In addition, the exemplary conditional expressions provided above may be randomly and selectively combined and applied to the embodiments of the invention in different manners; the invention should not be limited to the above examples.

3. The maximum and minimum numeral values derived from the combinations of the optical parameters disclosed in the embodiments of the invention may all be applicable and enable people skill in the pertinent art to implement the invention.

It will be apparent to those skilled in the art that various modifications and variations can be made to the structure of the invention without departing from the scope or spirit of the invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An optical imaging lens comprising a first lens element, a second lens element, a third lens element, a fourth lens element, a fifth lens element, and a sixth lens element sequentially arranged from an object side to an image side along an optical axis, wherein each of the first to the sixth lens elements comprises an object-side surface facing the object side and allowing imaging rays to pass through and an image-side surface facing the image side allowing the imaging rays to pass through;

the image-side surface of the second lens element having a concave portion in a vicinity of the optical axis;

the third lens element having a negative refractive power, the object-side surface of the third lens element having a concave portion in the vicinity of the optical axis;

the fourth lens element having a positive refractive power;

the object-side surface of the fifth lens element having a convex portion in a vicinity of a periphery;

the image-side surface of the sixth lens element having a concave portion in the vicinity of the periphery;

wherein among the lens elements of the optical imaging lens, only the first lens element, the second lens element, the third lens element, the fourth lens element, the fifth lens element, and the sixth lens element have refractive power, and the optical imaging lens satisfies:

$$(G12+G34+G45+G56)/G23 \leq 1.500,$$

wherein G12 is a distance from the image-side surface of the first lens element to the object-side surface of the second lens element along the optical axis, G34 is a distance from the image-side surface of the third lens element to the object-side surface of the fourth lens element along the optical axis, G45 is a distance from the image-side surface of the fourth lens element to the object-side surface of the fifth lens element along the optical axis, G56 is a distance from the image-side surface of the fifth lens element to the object-side surface of the sixth lens element along the optical axis, and G23 is a distance from the image-side surface of the second lens element to the object-side surface of the third lens element along the optical axis.

2. The optical imaging lens of claim 1, wherein the optical imaging lens further satisfies:

TTL/AAG$\leq$5.400, wherein TTL is a distance from the object-side surface of the first lens element to an imaging surface of the optical imaging lens along the optical axis, and AAG is a sum of five air gaps among the first to the sixth lens elements along the optical axis.

3. The optical imaging lens of claim 1, wherein the optical imaging lens further satisfies:

(T3+G34+T4+G45+T5)/G23$\leq$3.900, wherein T3 is a thickness of the third lens element along the optical axis, T4 is a thickness of the fourth lens element along the optical axis, and T5 is a thickness of the fifth lens element along the optical axis.

4. The optical imaging lens of claim 1, wherein the optical imaging lens further satisfies:

(T4+G45+T5)/T5$\leq$2.700, wherein T4 is a thickness of the fourth lens element along the optical axis, and T5 is a thickness of the fifth lens element along the optical axis.

5. The optical imaging lens of claim 1, wherein the optical imaging lens further satisfies:

(T4+G45+T5+G56+T6)/(T1+G12+T2)$\leq$2.400, wherein T4 is a thickness of the fourth lens element along the optical axis, T5 is a thickness of the fifth lens element along the optical axis, T6 is a thickness of the sixth lens element along the optical axis, T1 is a thickness of the first lens element along the optical axis, and T2 is a thickness of the second lens element along the optical axis.

6. The optical imaging lens of claim 1, wherein the optical imaging lens further satisfies:

ALT/T4$\leq$5.300, wherein ALT is a sum of a thickness of the first to the sixth lens elements along the optical axis, and T4 is the thickness of the fourth lens element along the optical axis.

7. The optical imaging lens of claim 1, wherein the optical imaging lens further satisfies:

TL/BFL$\leq$4.500, wherein TL is a distance from the object-side surface of the first lens element to the image-side surface of the sixth lens element along the optical axis, and BFL is a distance from the image-side surface of the sixth lens element to an imaging surface of the optical imaging lens along the optical axis.

8. An optical imaging lens comprising a first lens element, a second lens element, a third lens element, a fourth lens element, a fifth lens element, and a sixth lens element sequentially arranged from an object side to an image side along an optical axis, wherein each of the first to the sixth lens elements comprises an object-side surface facing the object side and allowing imaging rays to pass through and an image-side surface facing the image side and allowing the imaging rays to pass through;

the image-side surface of the second lens element having a concave portion in a vicinity of the optical axis;

the third lens element having a negative refractive power, the object-side surface of the third lens element having a concave portion in the vicinity of the optical axis;

the object-side surface of the fourth lens element having a convex portion in the vicinity of the optical axis;

the object-side surface of the fifth lens element having a convex portion in a vicinity of a periphery, the image-side surface of the fifth lens element having a concave portion in the vicinity of the periphery, wherein among the lens elements of the optical imaging lens, only the first lens element, the second lens element, the third lens element, the fourth lens element, the fifth lens element, and the sixth lens element have refractive power, and the optical imaging lens satisfies:

$$(G12+G34+G45+G56)/G23 \leq 1.500 \text{ and } TTL/EFL \leq 8.500,$$

wherein G12 is a distance from the image-side surface of the first lens element to the object-side surface of the second lens element along the optical axis, G34 is a distance from the image-side surface of the third lens element to the object-side surface of the fourth lens element along the optical axis, G45 is a distance from the image-side surface of the fourth lens element to the object-side surface of the fifth lens element along the optical axis, G56 is a distance from the image-side surface of the fifth lens element to the object-side surface of the sixth lens element along the optical axis, G23 is a distance from the image-side surface of the second lens element to the object-side surface of the third lens element along the optical axis, TTL is a distance from the object-side surface of the first lens element to an imaging surface of the optical imaging lens along the optical axis, and EFL is a system focal length of the optical imaging lens.

9. The optical aging lens of claim 8, wherein the optical imaging lens further satisfies:

(T3+G34+T4+G45+T5)/T5$\leq$3.100, wherein T3 is a thickness of the third lens element along the optical axis, T4 is a thickness of the fourth lens element along the optical axis, and T5 is a thickness of the fifth lens element along the optical axis.

10. The optical imaging lens of claim 8, wherein the optical imaging lens further satisfies:

(T4+G45+T5)/T2$\leq$4.500, wherein T4 is a thickness of the fourth lens element along the optical axis, T5 is a thickness of the fifth lens element along the optical axis, and T2 is a thickness of the second lens element along the optical axis.

11. The optical imaging lens of claim 8, wherein the optical imaging lens further satisfies:

AAG/G23$\leq$3.000, wherein AAG is a sum of five air gaps among the first to the sixth lens elements along the optical axis.

12. The optical imaging lens of claim 8, wherein the optical imaging lens further satisfies:

ALT/BFL≤2.800, wherein ALT is a sum of a thickness of the first to the sixth lens elements along the optical axis, and BFL is a distance from the image-side surface of the sixth lens element to an imaging surface of the optical imaging lens along the optical axis.

13. The optical imaging lens of claim 8, wherein the optical imaging lens further satisfies:

TL/(T1+G12+T2+G23+T3)≤2.600, wherein TL is a distance from the object-side surface of the first lens element to the image-side surface of the sixth lens element along the optical axis, T1 is a thickness of the first lens element along the optical axis, T2 is a thickness of the second lens element along the optical axis, and T3 is a thickness of the third lens element along the optical axis.

14. An optical imaging lens comprising a first lens element, a second lens element, a third lens element, a fourth lens element, a fifth lens element and a sixth lens element sequentially arranged from an object side to an image side along an optical axis, wherein each of the first to the sixth lens elements comprises an object-side surface facing the object side and allowing imaging rays to pass through and an image-side surface facing the image side and allowing the imaging rays to pass through;

the image-side surface of the second lens element having a concave portion in a vicinity of the optical axis;

the third lens element having a negative refractive power, the object-side surface of the third lens element having a concave portion in the vicinity of the optical axis, the image-side surface of the third lens element having a convex portion in the vicinity of the optical axis;

the fourth lens element having a positive refractive power, the object-side surface of the fourth lens element having a convex portion in a vicinity of a periphery;

the object-side surface of the fifth lens element having a convex portion in the vicinity of the periphery;

the image-side surface of the sixth lens element having a concave portion in the vicinity of the periphery, wherein among the lens elements of the optical imaging lens, only the first lens element, the second lens element, the third lens element, the fourth lens element, the fifth lens element, and the sixth lens element have refractive power.

15. The optical imaging lens of claim 14, wherein the optical imaging lens satisfies:

TTL/G23≤13.300, wherein TTL is a distance from the object-side surface of the first lens element to an imaging surface of the optical imaging lens, and G23 is a distance from the image-side surface of the second lens element to the object-side surface of the third lens element along the optical axis.

16. The optical imaging lens of claim 14, wherein the optical imaging lens satisfies:

(T3+G34+T4+G45+T5)/T2≤4.500, wherein T3 is a thickness of the third lens element along the optical axis, G34 is a distance from the image-side surface of the third lens element to the object-side surface of the fourth lens element along the optical axis, T4 is a thickness of the fourth lens element along the optical axis, G45 is a distance from the image-side surface of the fourth lens element to the object-side surface of the fifth lens element along the optical axis, T5 is a thickness of the fifth lens element along the optical axis, and T2 is a thickness of the second lens element along the optical axis.

17. The optical imaging lens of claim 14, wherein the optical imaging lens satisfies:

(T4+G45+T5+G56+T6)/AAG≤2.000, wherein T4 is a thickness of the fourth lens element along the optical axis, G45 is a distance from the image-side surface of the fourth lens element to the object-side surface of the fifth lens element along the optical axis, T5 is a thickness of the fifth lens element along the optical axis, G56 is a distance from the image-side surface of the fifth lens element to the object-side surface of the sixth lens element along the optical axis, T6 is a thickness of the sixth lens element along the optical axis, and AAG is a sum of five air gaps among the first to the sixth lens elements along the optical axis.

18. The optical imaging lens of claim 14, wherein the optical imaging lens satisfies:

(T1+G12+T2)/T6≤3.000, wherein T1 is a thickness of the first lens element along the optical axis, G12 is a distance from the image-side surface of the first lens element to the object-side surface of the second lens element along the optical axis, T2 is a thickness of the second lens element along the optical axis, and T6 is a thickness of the sixth lens element along the optical axis.

19. The optical imaging lens of claim 14, wherein the optical imaging lens satisfies:

(T1+G12+T2+G23+T3)/BFL≤2.100, wherein T1 is a thickness of the first lens element along the optical axis, G12 is the distance from the image-side surface of the first lens element to the object-side surface of the second lens element along the optical axis, T2 is a thickness of the second lens element along the optical axis, G23 is a distance from the image-side surface of the second lens element to the object-side surface of the third lens element along the optical axis, T3 is a thickness of the third lens element along the optical axis, and BFL is a distance from the image-side surface of the sixth lens element to an imaging surface of the optical imaging lens along the optical axis.

* * * * *